United States Patent
Hashizume

(10) Patent No.: US 12,438,483 B2
(45) Date of Patent: Oct. 7, 2025

(54) TRANSPORT APPARATUS

(71) Applicant: CANON KABUSHIKI KAISHA, Tokyo (JP)

(72) Inventor: Takuma Hashizume, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 293 days.

(21) Appl. No.: 18/062,027

(22) Filed: Dec. 6, 2022

(65) Prior Publication Data

US 2023/0188062 A1    Jun. 15, 2023

(30) Foreign Application Priority Data

Dec. 13, 2021    (JP) ................................. 2021-201832

(51) Int. Cl.
| | |
|---|---|
| H02P 6/16 | (2016.01) |
| B65G 54/02 | (2006.01) |
| H02K 11/22 | (2016.01) |
| H02K 41/03 | (2006.01) |
| H02P 6/00 | (2016.01) |
| H02P 25/064 | (2016.01) |

(52) U.S. Cl.
CPC .............. *H02P 6/006* (2013.01); *B65G 54/02* (2013.01); *H02K 11/22* (2016.01); *H02K 41/031* (2013.01); *H02P 6/16* (2013.01); *H02P 25/064* (2016.02); *B65G 2203/0283* (2013.01)

(58) Field of Classification Search
CPC .......... H02P 25/064; H02P 6/006; H02P 6/16; B65G 54/02; B65G 2201/02; H02K 41/031; H02K 11/22
See application file for complete search history.

(56) References Cited

U.S. PATENT DOCUMENTS

| | | | |
|---|---|---|---|
| 7,425,783 B2 * | 9/2008 | Sakiya ................... | H02P 25/06 310/12.22 |
| 8,384,251 B2 * | 2/2013 | Shikayama ........... | H02K 41/031 310/12.09 |

(Continued)

FOREIGN PATENT DOCUMENTS

| | | |
|---|---|---|
| JP | 2011-211180 A | 10/2011 |
| JP | 2017-507870 A | 3/2017 |

(Continued)

OTHER PUBLICATIONS

Japanese Office Action issued Sep. 2, 2025 during prosecution of related Japanese application No. JP 2021-201832 (English language machine translation included).

*Primary Examiner* — Thai T Dinh
(74) *Attorney, Agent, or Firm* — VENABLE LLP

(57) ABSTRACT

A transport apparatus includes: a stator; a mover that includes a first scale and is movable along the stator in a first direction; a plurality of first detectors each of which is provided to be able to face the first scale and detects a position of the mover in a second direction crossing the first direction; and a control unit that controls position and/or attitude of the mover, the first scale and the first detector constitute an incremental encoder, wherein the plurality of first detectors are arranged at a predetermined interval along the first direction in the stator, and the control unit corrects position information of the mover by a detection value of one of the first detectors based on position information of the mover by a detection value of another of the first detectors.

11 Claims, 17 Drawing Sheets

(56) References Cited

U.S. PATENT DOCUMENTS

| | | | | |
|---|---|---|---|---|
| 11,146,160 | B2* | 10/2021 | Frangen | H02P 25/064 |
| 11,370,621 | B2* | 6/2022 | Yamamoto | B65G 49/06 |
| 12,075,319 | B2* | 8/2024 | Dulee | H04L 63/083 |
| 2005/0087300 | A1 | 4/2005 | Ishizawa et al. | |
| 2007/0288121 | A1 | 12/2007 | Shibazaki | |
| 2008/0094592 | A1 | 4/2008 | Shibazaki | |
| 2008/0165345 | A1 | 7/2008 | Hill | |
| 2013/0099106 | A1 | 4/2013 | Kimura | |
| 2015/0205303 | A1 | 7/2015 | Ishikawa | |
| 2018/0236895 | A1 | 8/2018 | Hanaka et al. | |
| 2019/0214930 | A1 | 7/2019 | Mukai | |
| 2020/0052568 | A1* | 2/2020 | Yamamoto | H02K 11/21 |
| 2021/0175787 | A1* | 6/2021 | Yamamoto | H02K 41/02 |
| 2021/0188569 | A1* | 6/2021 | Yamamoto | B65G 49/06 |
| 2021/0245974 | A1 | 8/2021 | Hashizume et al. | |
| 2021/0249943 | A1 | 8/2021 | Yamamoto | |

FOREIGN PATENT DOCUMENTS

| | | | |
|---|---|---|---|
| JP | 2019-100959 | A | 6/2019 |
| JP | 2019-138694 | A | 8/2019 |
| JP | 2021-126003 | A | 8/2021 |
| JP | 2021-126040 | A | 8/2021 |

\* cited by examiner

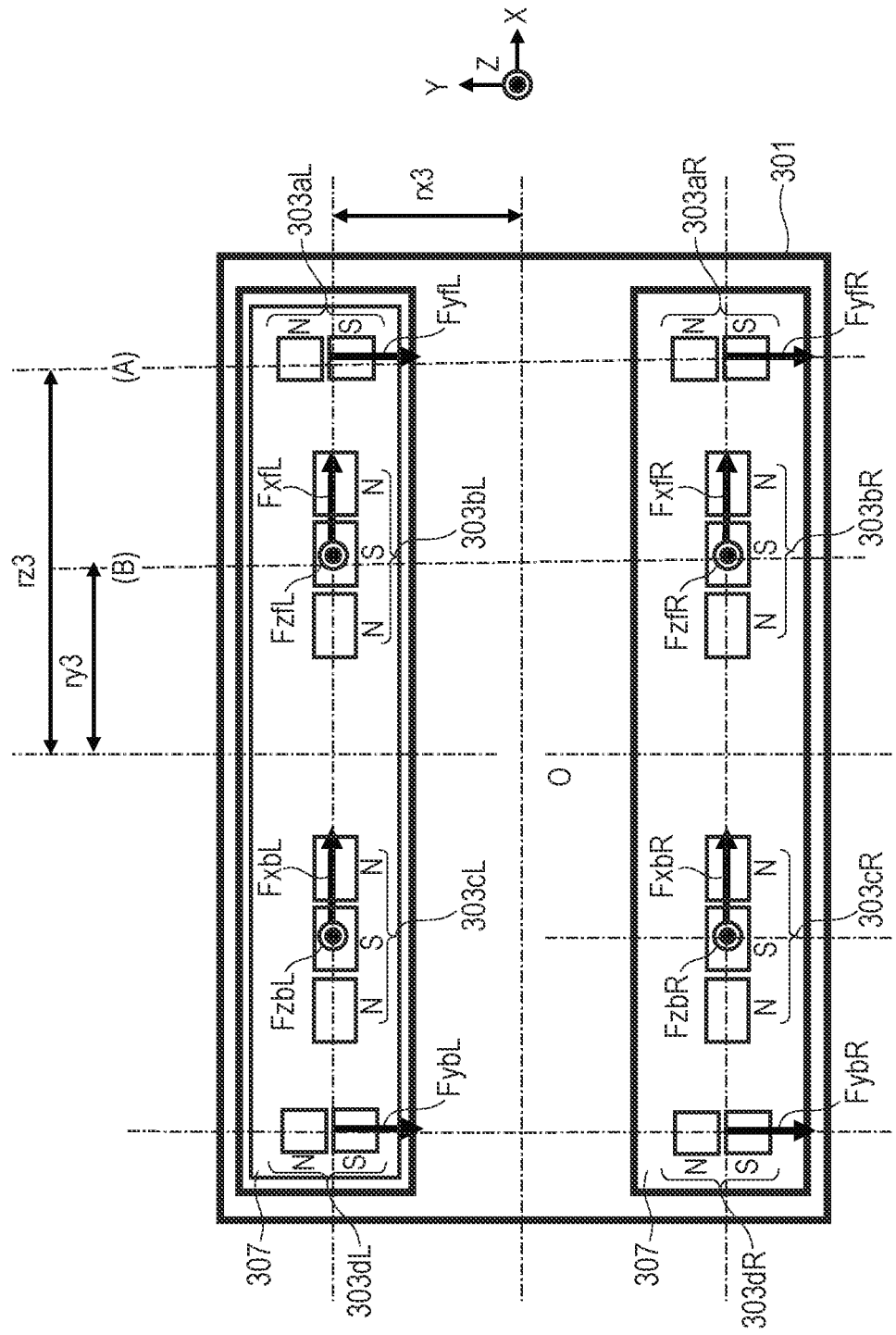

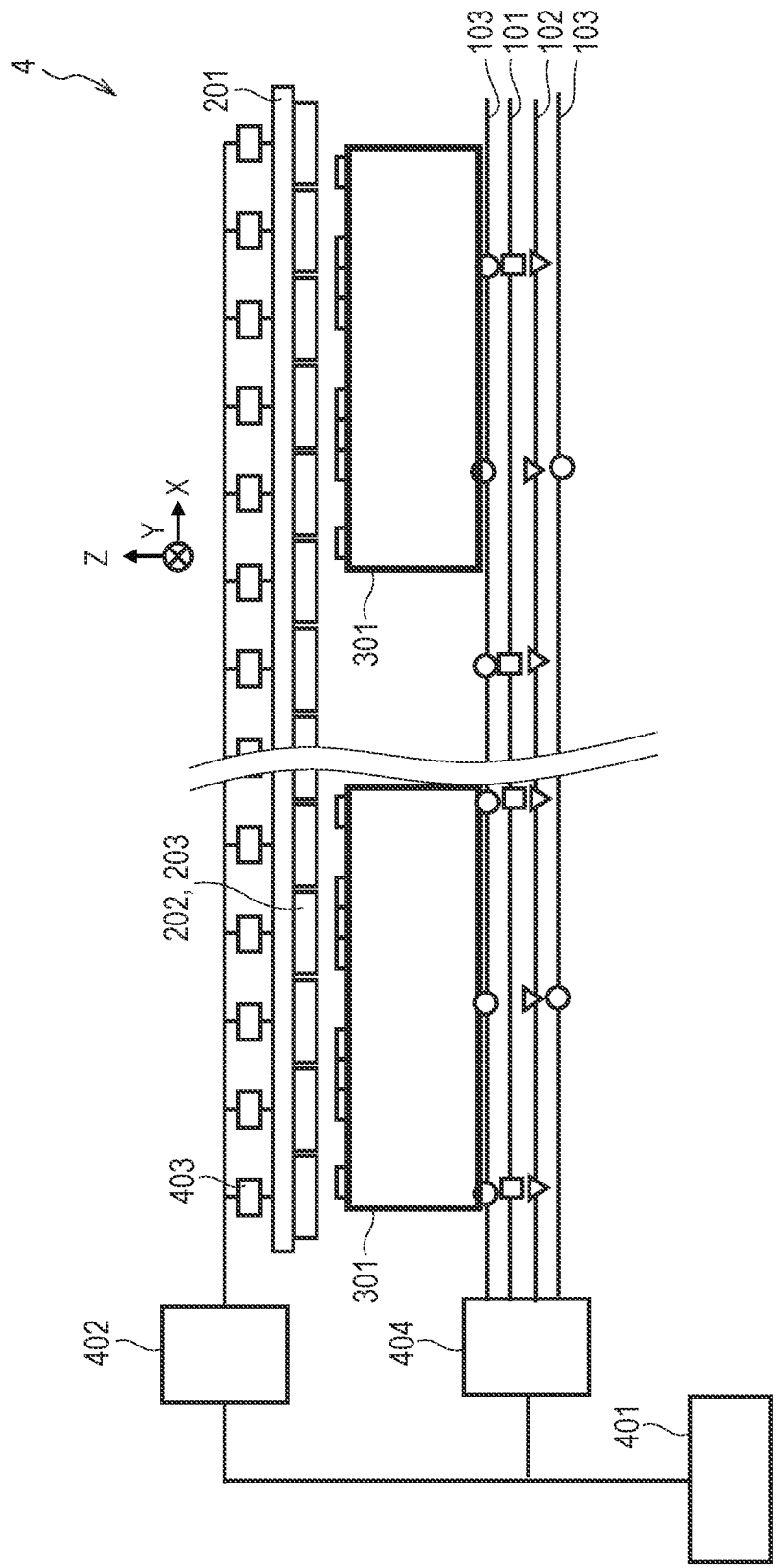

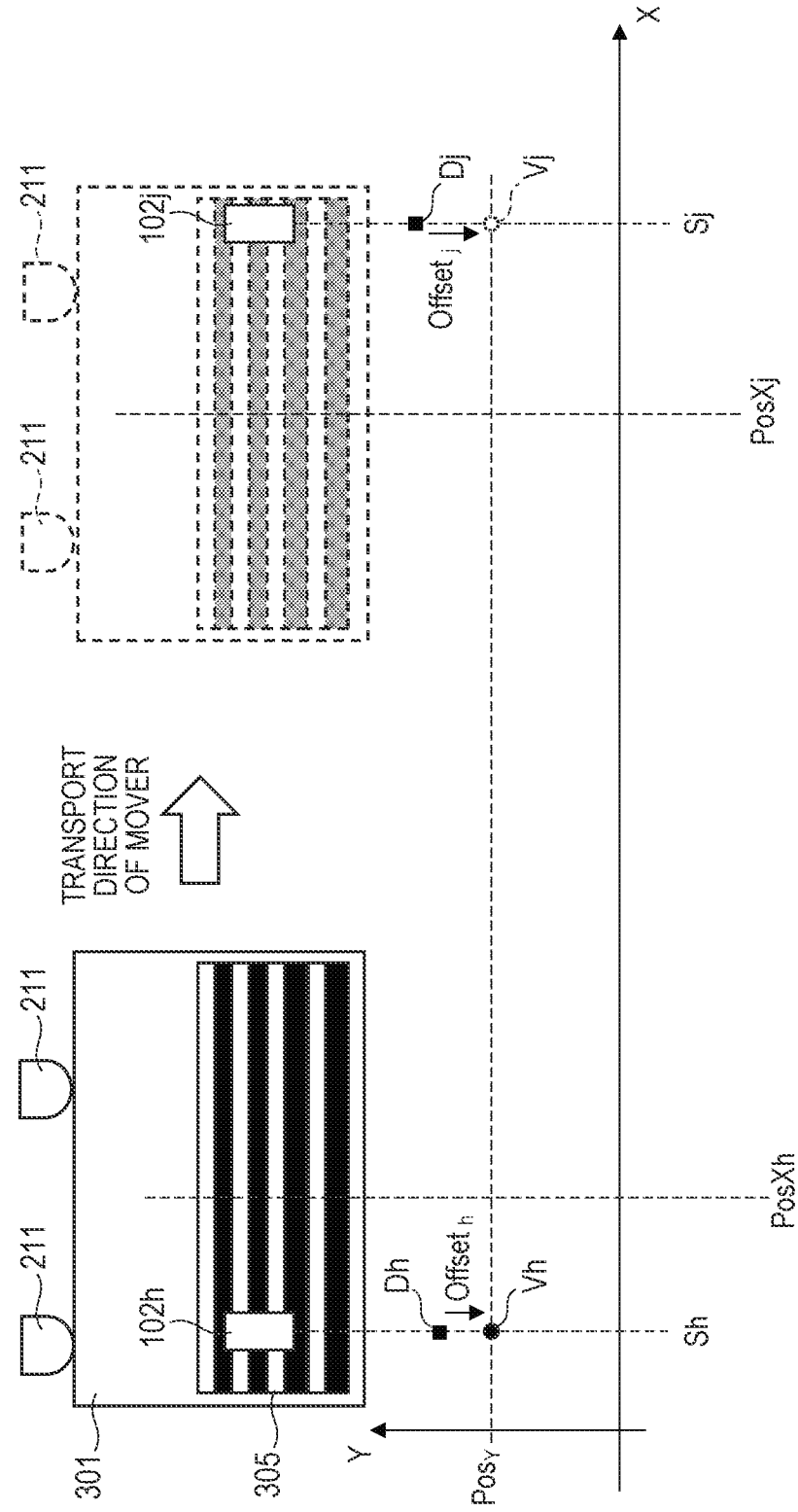

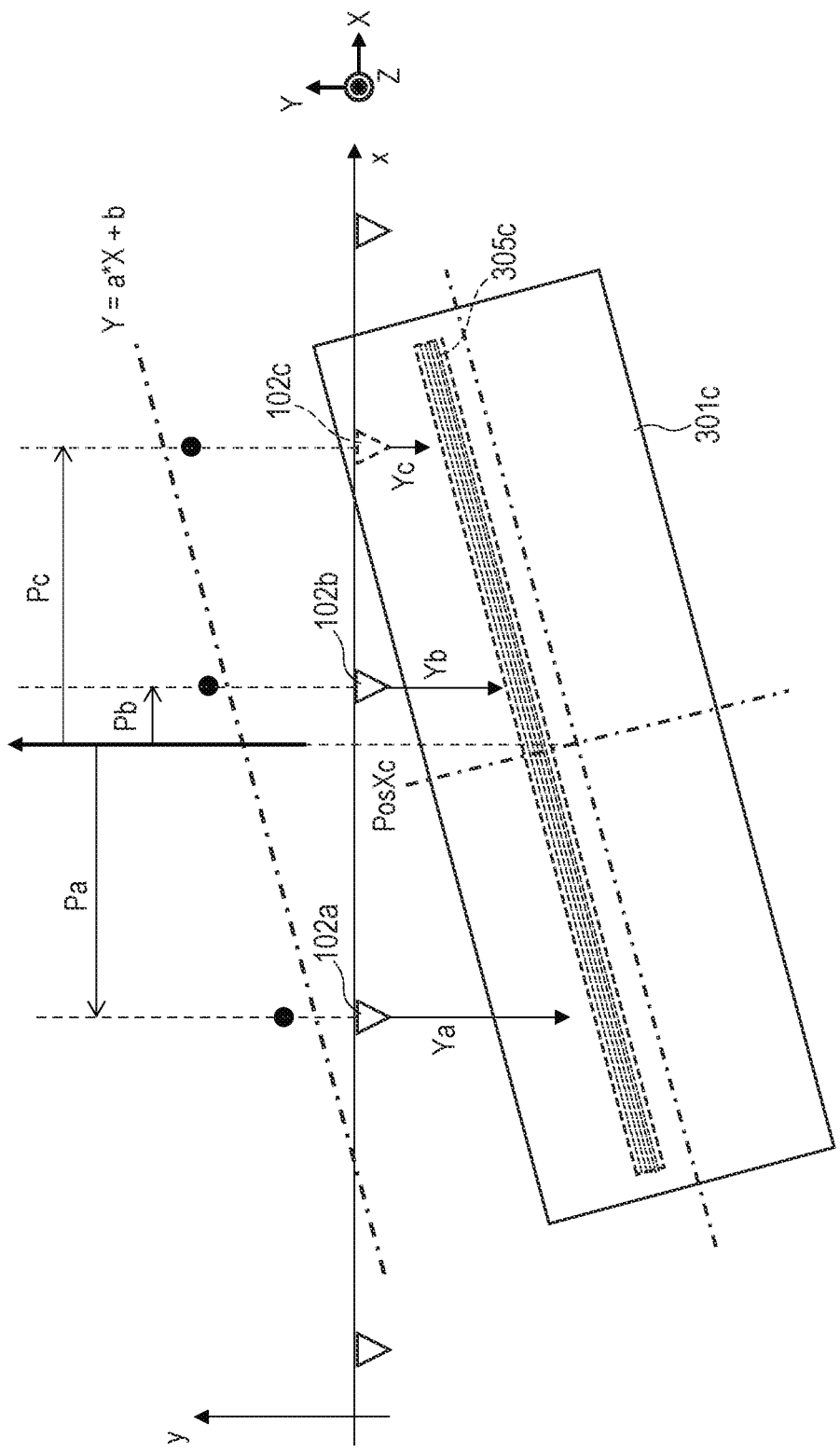

TRANSPORT APPARATUS

BACKGROUND OF THE INVENTION

Field of the Invention

The present invention relates to a transport apparatus.

Description of the Related Art

In general, a transport apparatus is used in a production line used for assembling industry products, a semiconductor exposure apparatus, or the like. In particular, a transport apparatus in a production line transports workpieces such as components between a plurality of stations within a factory-automated production line or between factory-automated production lines. Further, such a transport apparatus may be used as a transport apparatus within a process apparatus. As the transport apparatus, a transport apparatus with a movable magnet type linear motor has already been proposed.

In the transport apparatus using the movable magnet type linear motor, permanent magnets are arranged on a mover, and a stator is installed on a frame so as to face the permanent magnets. Further, the transport apparatus is provided with sensors that detect the mover in the frame where the stator is installed. The position and attitude of the mover are calculated based on the detection data of the sensors, and the drive control of the linear motor is performed based on the position and attitude.

As the sensor that detects the mover, a ranging sensor such as an eddy current sensor, a laser displacement meter, a magnetic sensor, or the like is used. For example, in Japanese Patent No. 6538710, a Hall element that is a magnetic sensor is used to detect a mover to make the mover controlled.

In the transport apparatus according to Japanese Patent No. 6538710, in the method of detecting the position of the mover using the Hall element, the detection range of the sensor is narrow, and it is difficult to secure a wide range of motion of the mover. Further, in the eddy current sensor and the laser displacement meter, when the detection range of the mover is intended to be increased, there is a problem that the sensor size is increased and the resolution is decreased.

In contrast, it is possible to detect the position and attitude of the mover by an incremental encoder. However, in this case, when the detector of the encoder for detecting the scale of the mover is switched, the initial value of the encoder becomes indefinite, and the detection accuracy of the position and attitude of the mover may be lowered or the detection may become difficult.

It is an object of the present invention to provide a transport apparatus capable of detecting the position and/or attitude of a mover in a wide range and with high accuracy when an incremental encoder is used.

SUMMARY OF THE INVENTION

According to an aspect of the present invention, provided is a transport apparatus including: a stator; a mover that includes a first scale and is movable along the stator in a first direction; a plurality of first detectors each of which is provided to be able to face the first scale and detects a position of the mover in a second direction crossing the first direction; and a control unit that controls position and/or attitude of the mover, wherein the first scale and the first detector constitute an incremental encoder, wherein the plurality of first detectors are arranged at a predetermined interval along the first direction in the stator, and wherein the control unit corrects position information of the mover by a detection value of one of the first detectors based on position information of the mover by a detection value of another of the first detectors.

Further features of the present invention will become apparent from the following description of exemplary embodiments with reference to the attached drawings.

BRIEF DESCRIPTION OF THE DRAWINGS

FIG. 2B is a schematic diagram illustrating the transport apparatus according to the embodiment of the present invention.

FIG. 3 is a schematic diagram illustrating a control unit that controls the transport apparatus according to the embodiment of the present invention.

FIG. 8D is a schematic diagram illustrating acquisition of a correction value for converting a detection value of a sensor in the direction orthogonal to the transport direction to a relative distance to the mover in the transport apparatus according to the embodiment of the present invention.

FIG. 10 is a schematic diagram illustrating a mover attitude calculation process in a direction orthogonal to the transport direction of the embodiment of the present invention.

DESCRIPTION OF THE EMBODIMENTS

One Embodiment

A transport apparatus according to an embodiment of the present invention will be described with reference to FIG. 1 to FIG. 12.

Figure 1:
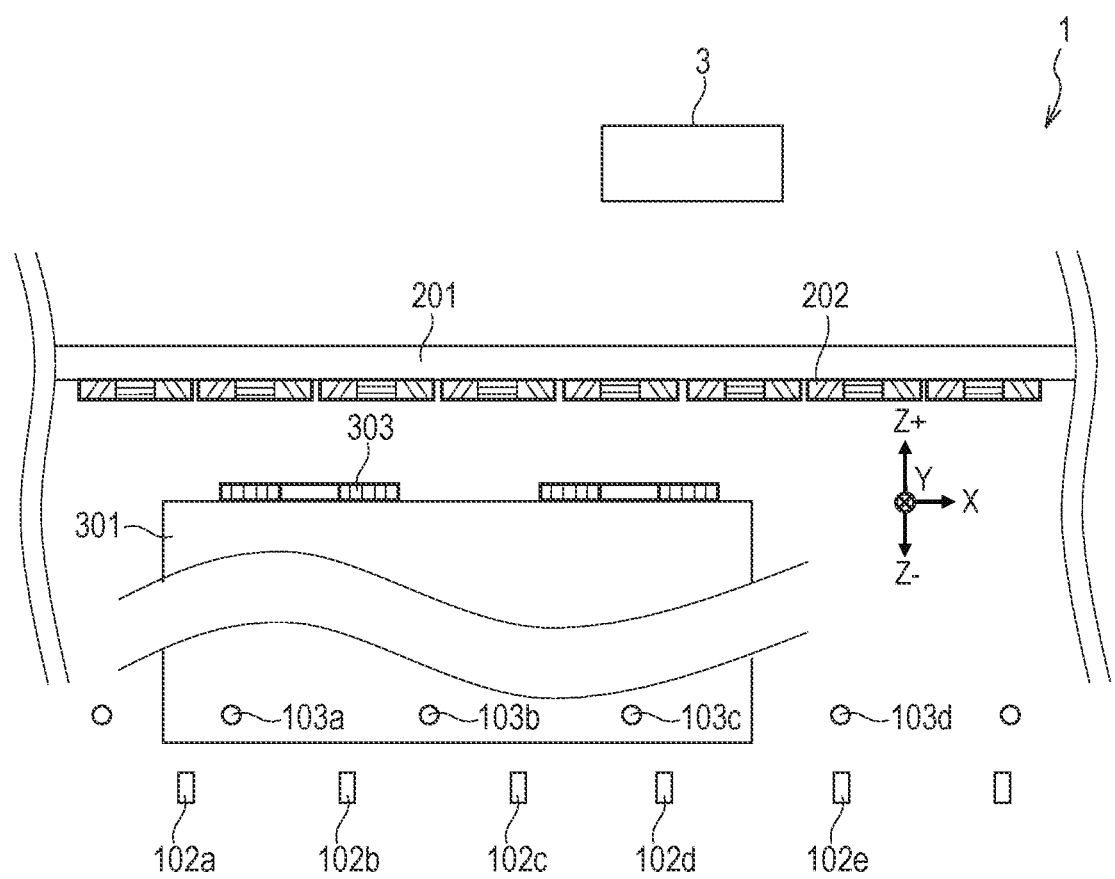
FIG. 1 is a schematic diagram illustrating a transport apparatus according to an embodiment of the present invention.
Figure 2A:
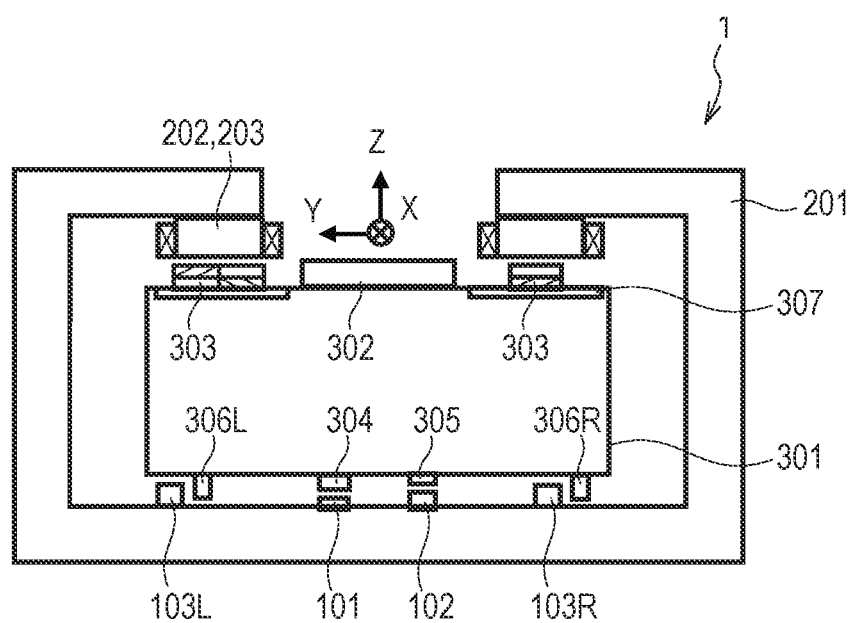
FIG. 2A is a schematic diagram illustrating the transport apparatus according to the embodiment of the present invention.

First, the configuration of the transport apparatus according to the present embodiment will be described with reference to FIG. 1, FIG. 2A and FIG. 2B. FIG. 1, FIG. 2A and FIG. 2B are schematic diagrams illustrating the transport apparatus according to the present embodiment. FIG. 1 is a schematic view of a stator 201 and a mover 301 according to the present embodiment as viewed from a Y direction. FIG. 2A is a schematic view of the stator 201 and the mover 301 according to the present embodiment viewed from a-X direction. FIG. 2B is a schematic diagram illustrating the arrangement of permanent magnets 303 on the top surface of the mover 301. The left half of FIG. 2A illustrates a cross section (A) along a line (A)-(A) in FIG. 2B. The right half of FIG. 2A illustrates a cross section (B) along a line (B)-(B) in FIG. 2B.

As illustrated in FIG. 1, FIG. 2A and FIG. 2B, the transport apparatus 1 according to the present embodiment includes a stator 201 forming a transport path and a mover 301 forming a carriage, slider or carriage. Note that, in FIG. 1, FIG. 2A and FIG. 2B, one mover 301 is illustrated with respect to the stator 201, but the number of the mover 301 is not limited to this. In the transport apparatus 1, a plurality of movers 301 may be transported on the stator 201 along the stator 201.

The transport apparatus 1 according to the present embodiment can be used to transport a workpiece 302 held by the mover 301 to a production apparatus 3 by transporting the mover 301 by the stator 201. In addition, the transport apparatus 1 according to the present embodiment can also be used as a transport apparatus in a production apparatus (process apparatus). An article can be manufactured with high accuracy by performing operation (process operation) such as processing operation, inspection operation, and the like on the workpiece 302 held by the mover 301 transported by the transport apparatus 1 according to the present embodiment.

Note that the system including the transport apparatus 1 and the production apparatus 3 according to the present embodiment may be referred to as a production system in the present specification. The production apparatus 3 in the present specification refers to an apparatus for performing operation such as processing operation, inspection operation, and the like on the workpiece 302, and includes, for example, an inspection apparatus, an assembly apparatus, a semiconductor exposure apparatus, a vapor deposition apparatus, and the like. The production system according to the present embodiment may include a plurality of production apparatuses 3, and the plurality of production apparatuses 3 may be production apparatuses for performing the same operation on the workpiece 302, or may be production apparatuses for performing different operations.

Herein, coordinate axes, directions and the like used in the following description are defined. First, an X-axis is taken along the horizontal direction that is the transport direction of the mover 301, and the transport direction of the mover 301 is define as the X direction. Further, a Z-axis is taken along the perpendicular direction that is a direction orthogonal to the X direction, and the perpendicular direction is defined as a Z direction. Further, a Y-axis is taken along a direction orthogonal to the X direction and the Z direction, and the direction orthogonal to the X direction and the Z direction is defined as the Y direction. Further, a rotation around the X-axis is defined as a Wx, a rotation around the Y-axis is defined as a Wy, and a rotation around the Z-axis is defined as a Wz. Further, "*" is used as a symbol of multiplication and "^" is used as a symbol of power. Further, the −Y side of the mover 301 is denoted as R side, and the +Y side of the mover 301 is denoted as L side. Note that, although the transport direction of the mover 301 is not necessarily required to be a horizontal direction, the Y direction and the Z direction can be similarly defined also in such a case with the transport direction being defined as the X direction. Note that the X direction, the Y direction, and the Z direction are not necessarily limited to directions orthogonal to each other and can be defined as directions crossing each other.

In the present embodiment, a case where the transport apparatus 1 is a transport apparatus using a movable magnet type linear motor (moving permanent magnet type linear motor or moving field type linear motor) is exemplified, but the transport apparatus 1 is not limited thereto. The transport apparatus 1 may be a transport apparatus using a movable coil type linear motor (moving coil type linear motor or fixed field type linear motor). Further, the transport apparatus 1 is configured as a magnetically floating type transport apparatus which does not have a guide device such as a linear guide or the like and transports the mover 301 over the stator 201 in a contactless manner.

As illustrated in FIG. 2B, the mover 301 includes permanent magnets 303aR, 303bR, 303cR, 303dR, 303aL, 303bL, 303cL, and 303dL as permanent magnets 303. The permanent magnets 303 are attached to be installed on the upper surface of the mover 301.

Specifically, the permanent magnets 303aR, 303bR, 303cR, and 303dR are attached to the upper surface of the mover 301 on the R side. The permanent magnets 303aL, 303bL, 303cL, and 303dL are attached to the upper surface of the mover 301 on the L side. Hereinafter, the permanent magnet of the mover 301 is simply referred to as "permanent magnet 303" unless it is necessary to make a special distinction. Although it is not necessary to distinguish between the R side and the L side, when it is necessary to individually identify each permanent magnet 303, each permanent magnet 303 is individually identified by using the reference sign for each permanent magnet 303 up to the lowercase alphabet excluding R or L from the end of the reference sign as an identifier. In this case, "permanent magnet 303a", "permanent magnet 303b", "permanent magnet 303c", or "permanent magnet 303d" is used to individually identify each permanent magnet 303.

The permanent magnets 303aR and 303dR are attached to one end and the other end in the X direction on the upper surface of the mover 301 on the R side along the X direction. The permanent magnets 303bR and 303cR are attached between the permanent magnets 303aR and 303dR on the upper surface of the mover 301 on the R side. The permanent magnets 303aR, 303bR, 303cR, and 303dR are arranged at a constant pitch in the X direction, for example. The permanent magnets 303aR, 303bR, 303cR, and 303dR are arranged so that their respective centers are aligned on a straight line along the X direction passing through, for example, the center of the upper surface on the R side of the mover 301.

The permanent magnets 303aL and 303dL are attached to one end and the other end in the X direction on the upper surface of the mover 301 on the L side along the X direction. The permanent magnets 303bL and 303cL are attached between the permanent magnets 303aL and 303dL on the upper surface of the mover 301 on the L side. The permanent magnets 303aL, 303bL, 303cL, and 303dL are arranged at a constant pitch in the X direction, for example. The permanent magnets 303aL, 303bL, 303cL, and 303dL are arranged so that their respective centers are aligned on a straight line along the X direction passing through, for example, the center of the upper surface on the L side of the mover 301. Further, the permanent magnets 303aL, 303bL, 303cL, and 303dL are disposed at the same positions in the X direction as the permanent magnets 303aR, 303bR, 303cR, and 303dR, respectively. The permanent magnet 303a is a first permanent magnet group consisting of a plurality of first permanent magnets. The permanent magnet 303d is a first permanent magnet group consisting of a plurality of first permanent magnets.

Note that, in the present embodiment, the magnet group is provided on the upper surface of the mover 301, but the magnet group may be provided on the side surface of the mover 301.

The permanent magnets 303aR, 303bR, 303cR, and 303dR disposed on the R side of the upper surface of the mover 301 are respectively disposed at positions separated by a distance rx3 from the origin O, which is the center of the mover 301, to the R side in the Y direction.

The permanent magnets 303aL, 303bL, 303cL, and 303dL disposed on the L side of the upper surface of the mover 301 are disposed at positions separated by a distance rx3 from the origin O to the L side in the Y direction.

The permanent magnets 303a and 303d are respectively attached at positions separated from the origin O by a distance rz3 on one side and the other side in the X direction. The permanent magnets 303c and 303b are respectively attached at positions separated from the origin O by a distance ry3 on one side and the other side in the X direction. On the upper surface of the mover 301, the central portion between the portion on the R side and the portion on the L side where the permanent magnets 303 are disposed as described above is a portion on which the workpiece 302 to be transported is placed.

Each of the permanent magnets 303aR, 303dR, 303aL, and 303dL is a set of two permanent magnets that are arranged along the Y direction. Each of the permanent magnets 303a and 303d is constituted by arranging two permanent magnets along the Y direction so that the polarities of the outer magnetic poles facing the stator 201 side are alternately different. Note that the number of permanent magnets arranged along the Y direction constituting the permanent magnets 303a and 303d is not limited to two, but may be a plurality. Note also that the permanent magnets constituting the permanent magnets 303a and 303d are not necessarily arranged in the Y direction orthogonal to the X direction, which is the transport direction, but may be arranged in a direction (second direction) crossing the X direction (first direction). That is, the permanent magnets 303a and 303d may be a magnet group consisting of a plurality of permanent magnets arranged along a direction (second direction) crossing the X direction so that the polarities of the magnetic poles alternately different.

On the other hand, each of the permanent magnets 303bR, 303cR, 303bL, and 303cL is a set of three permanent magnets arranged along the X direction. Each of the permanent magnets 303b and 303c is constituted by arranging three permanent magnets along the X direction so that the polarities of the outer magnetic poles facing the stator 201 side are alternately different. Note that the number of permanent magnets arranged along the X direction constituting the permanent magnets 303b and 303c is not limited to three, but may be a plurality. That is, the permanent magnets 303b and 303c may be a magnet group consisting of a plurality of permanent magnets arranged along the X direction so that the polarities of the magnetic poles alternately different. The permanent magnet 303b is a second permanent magnet group consisting of a plurality of second permanent magnets. The permanent magnet 303c is a second permanent magnet group consisting of a plurality of second permanent magnets.

Each of the permanent magnets 303 is attached to a yoke 307 provided on the upper surfaces of the R side and the L side of the mover 301. The yoke 307 is made of a material having a large permeability, for example, iron. In the present specification, a material having a large permeability means a substance having a permeability of 5000 or more.

The mover 301 with the permanent magnets 303 disposed thereon in this way is moved along the stator 201 by the plurality of coils 202 of the stator 201 while its attitude is controlled by six axes by electromagnetic force applied to the permanent magnets 303 as described later.

The mover 301 is movable in the X direction along a plurality of coils 202 arranged in two lines in the stator 201 described below. The mover 301 can be transported with the workpiece 302 to be transported placed on its upper surface. The mover 301 may have, for example, a holding mechanism for holding the workpiece 302 such as a workpiece holder or the like on the mover 301.

The mover 301 transported on the stator 201 along the stator 201 has an X linear scale 304, a Y linear scale 305, and Z linear scales 306L and 306R. The X linear scale 304, the Y linear scale 305, and the Z linear scales 306L and 306R are respectively attached to the bottom of the mover 301 along the X direction. The Z linear scales 306L and 306R are attached to both sides of the X linear scale 304 and the Y linear scale 305, respectively. In the mover 301 facing the X direction, the X linear scale 304, the Y linear scale 305, and the Z linear scales 306L and 306R are formed with a scale with a predetermined interval in the X direction, the Y direction, and the Z direction, respectively. The X linear scale 304, together with an X sensor 101 described later, constitutes an incremental linear encoder for detecting the displacement of the mover 301 in the X direction. The Y linear scale 305, together with a Y sensor 102 described later, constitutes an incremental linear encoder for detecting the displacement of the mover 301 in the Y direction. The Z linear scales 306L and 306R constitute incremental linear encoders for detecting the displacement of the mover 301 in the Z direction together with Z sensors 103L and 103R described later, respectively.

The stator 201 has a plurality of coils 202 arranged in two lines along the X direction which is the transport direction of the mover 301. In the stator 201, the plurality of coils 202 are attached to be disposed above the upper surface of the mover 301 so as to face the mover 301. The stator 201 extends in the X direction, which is the transport direction, and forms a transport path which is a space where the mover 301 is transported.

The plurality of coils 202 are arranged in two lines along the X direction and attached to the stator 201 so as to face the permanent magnets 303 on the R and L sides of the mover 301. The plurality of coils 202 arranged in one line on the R side are arranged along the X direction so as to face the permanent magnets 303aR, 303bR, 303cR, and 303dR on the R side of the mover 301. The plurality of coils 202 arranged in one line on the L side are arranged along the X direction so as to face the permanent magnets 303aL, 303bL, 303cL, and 303dL on the L side of the mover 301.

In the present embodiment, the lines of coils 202 on the R side and the L side of the mover 301 are arranged so as to be able to face the permanent magnets 303a and 303d, and the permanent magnets 303b and 303c, respectively, having different arrangement directions of the plurality of constituting permanent magnets each other. Therefore, with a small number of lines of the coils 202, force in the transport direction and force in a direction different from the transport direction can be applied to the mover 301 as will be described later, so that the transport control and the attitude control of the mover 301 can be realized.

The plurality of coils 202 are arranged at predetermined intervals in the X direction. Each of the coil 202 is attached so that its central axis faces the Z direction. Note that the coil 202 may be a cored coil or a coreless coil.

The current of the plurality of coils 202 is controlled in units of, for example, three coils each. The unit in which current of the coils 202 is controlled is referred to as a "coil unit 203". When current flows through the coil 202, electromagnetic force is generated between the coil 202 and the permanent magnet 303 of the mover 301, and the force can be applied to the mover 301.

In FIG. 2B, each of the permanent magnets 303a and 303d is composed of a magnet group in which two permanent magnets are arranged in the Y direction. On the other hand, each of coils 202 is arranged so that the centers in the Y direction of the two permanent magnets of the permanent magnets 303a and 303d coincides with the center in the Y direction of the coil 202. Current flows through the coil 202 facing the permanent magnets 303a and 303d to generate force in the Y direction with respect to the permanent magnets 303a and 303d.

Each of the permanent magnets 303b and 303c is composed of a magnet group in which three permanent magnets are arranged in the X direction. With this arrangement, current flows through the coil 202 facing the permanent magnets 303b and 303c to generate force in the X direction and the Z direction with respect to the permanent magnets 303b and 303c.

As illustrated in FIG. 2A, the stator 201 has X sensors 101, Y sensors 102, and Z sensors 103L and 103R. A plurality of X sensors 101, a plurality of Y sensors 102, and a plurality of Z sensors 103L and 103R are installed at the bottom of the stator 201 so as to face the X linear scale 304, the Y linear scale 305, and the Z linear scale 306L and 306R of the mover 301, respectively.

The X sensor 101 is, for example, an encoder head that is a detector of a linear encoder that detects the X linear scale 304 attached to the mover 301 and identifies the position of the mover 301 in the transport direction. The X sensor 101, together with the X linear scale 304 attached to the mover 301, constitutes an incremental linear encoder for detecting the displacement of the mover 301. The plurality of X sensors 101 are arranged at predetermined intervals along the X direction in the stator 201. Preferably, the predetermined interval at which the plurality of X sensors 101 are arranged in the X direction is equal to or less than the length of the X linear scale 304 along the X direction so that the plurality of X sensors 101 simultaneously detect the X linear scale 304. Note that the X sensor 101 may be configured other than a linear encoder such as a laser interferometer or the like.

The Y sensor 102 is, for example, an encoder head that is a detector of a linear encoder that detects the Y linear scale 305 attached to the mover 301 and detects a distance to the mover 301 in the Y direction. The Y sensor 102, together with the Y linear scale 305 attached to the mover 301, constitutes an incremental linear encoder for detecting the displacement of the mover 301. The plurality of Y sensors 102 are arranged at predetermined intervals along the X direction in the stator 201. Preferably, the predetermined interval at which the plurality of Y sensors 102 are arranged in the X direction is equal to or less than the length of the Y linear scale 305 along the X direction so that the plurality of Y sensors 102 simultaneously detect the Y linear scale 305.

The Z sensors 103L and 103R are encoder heads that are detectors of linear encoder detectors that detect the Z linear scales 306L and 306R attached to the mover 301 and detect distances to the mover 301 in the Z direction. The Z sensors 103L and 103R, together with the Z linear scales 306L and 306R attached to the mover 301, constitute incremental linear encoders for detecting the displacements of the mover 301, respectively. The plurality of Z sensors 103L and 103R are arranged at predetermined intervals along the X direction in the stator 201. Preferably, the predetermined interval at which the plurality of Z sensors 103L and 103R are arranged in the X direction is equal to or less than the length of the Z linear scales 306L and 306R along the X direction so that the plurality of Z sensors 103L and 103R simultaneously detect the Z linear scales 306L and 306R.

The plurality of X sensors 101 are attached to the stator 201 along the X direction (the first direction) so as to respectively face the X linear scale 304 of the mover 301. Each of the X sensors 101 can detect the relative position of the mover 301 with respect to the X sensor 101 by reading the X linear scale 304 attached to the mover 301, and output the detected value.

The plurality of Y sensors 102 are attached to the stator 201 along the X direction (the first direction) so as to respectively face the Y linear scale 305 of the mover 301. Each of the Y sensors 102 can detect the displacement in the Y direction by reading the Y linear scale 305 attached to the mover 301, and outputs the detected value. Thus, the attitude of the mover 301 in the Y direction can be detected. Note that the Y sensor 102 does not necessarily detect the relative distance in the Y direction orthogonal to the X direction, which is the transport direction, but may detect the relative distance in a direction (the second direction) crossing the X direction (the first direction).

The plurality of Z sensors 103 are attached to the stator 201 in two lines along the X direction so as to respectively face the Z linear scales 306 of the mover 301. Each Z sensor 103 can detect and output the displacement in the Z direction with respect to the Z linear scale 306 attached to the mover 301. Thus, the attitude of the mover 301 in the Z direction, which is the perpendicular direction, can be detected. Note that the Z sensor 103 does not necessarily detect the relative distance in the Z direction orthogonal to the X direction, which is the transport direction, but may detect the relative distance in a direction (the third direction) crossing the X direction (the first direction) and the Y direction (the second direction).

Note that, in the present embodiment, the case is exemplified, in which the X sensors 101, the Y sensors 102, and the Z sensors 103 are disposed at the bottom of the stator 201, and the X linear scale 304, the Y linear scale 305, and the Z linear scale 306 are disposed at the bottom of the mover 301. However, the location of each sensor and each scale is not limited to this exemplified case. The X linear scale 304, the Y linear scale 305 and the Z linear scale 306 may be installed at any position of the mover 301. The X sensor 101, the Y sensor 102, and the Z sensor 103 may be installed at any position of the stator 201 as long as they can face the X linear scale 304, the Y linear scale 305, and the Z linear scale 306, respectively.

In addition, note that it is not necessary that both of the Y sensor 102 and the Z sensor 103 are installed in the stator 201, but only one of them may be installed. Even in this case, the effect of the present invention can be demonstrated. For example, even if the Y sensor 102 is not installed, the mover 301 may not be controlled in the Y direction, only with the attraction force of the magnet. In addition, even if the Z sensor 103 is not installed, the mover 301 may not be controlled the Z direction, only with the attraction force of the magnet. Alternatively, another method such as air or the like may be used to float the mover 301 in the Z direction. Furthermore, the present invention can be applied to an XY stage or the like in which the floating control in the Z direction is not performed. Next, a control unit that controls the transport apparatus 1 according to the present embodiment will be described further with reference to FIG. 3. FIG. 3 is a schematic diagram illustrating the control unit 4 that controls the transport apparatus 1 according to the present embodiment. The control unit 4 constitutes a part of the transport apparatus 1.

As illustrated in FIG. 3, the control unit 4 includes an integration controller 401, a coil controller 402, and a sensor controller 404, and functions as a control unit that controls the transport apparatus 1 including the mover 301 and the stator 201. The coil controller 402 is connected to the integration controller 401 in a communicable manner. The sensor controller 404 is connected to the integration controller 401 in a communicable manner.

A plurality of current controllers 403 are connected to the coil controller 402 in a communicable manner. The coil controller 402 and the plurality of current controllers 403 connected thereto are provided corresponding to each line of the two lines of the coils 202. The coil unit 203 is connected to each of the current controllers 403. The current controller 403 can control the magnitude of the current in each coil 202 of the coil unit 203 connected thereto.

The coil controller 402 commands a target current value to each current controller 403 connected thereto. The current controller 403 controls the current amount of the coil 202 connected thereto.

The plurality of X sensors 101, the plurality of Y sensors 102 and the plurality of Z sensors 103 are connected to the sensor controller 404 in a communicable manner.

The plurality of X sensors 101 are attached to the stator 201 at intervals such that one of them is always capable of measuring the position of one mover 301 while the mover 301 is being transported. Further, the plurality of Y sensors 102 are attached to the stator 201 at intervals such that two of them are always capable of measuring the Y linear scale 305 of the one mover 301. Further, the plurality of Z sensors 103 are attached to the stator 201 at intervals such that three out of the two lines of them are always capable of measuring the Z linear scale 306 of the one mover 301.

The integration controller 401 determines current command values to be applied to the plurality of coils 202 based on the outputs from the X sensors 101, the Y sensors 102, and the Z sensors 103, and transmits the current command values to the coil controller 402. The coil controller 402 commands current values to the current controllers 403 based on the current command values from the integration controller 401 as described above. Thus, the integration controller 401 functions as a control unit to transport the mover 301 along the stator 201 in a contactless manner and control the attitude of the transported mover 301 in six axes.

Figure 4:
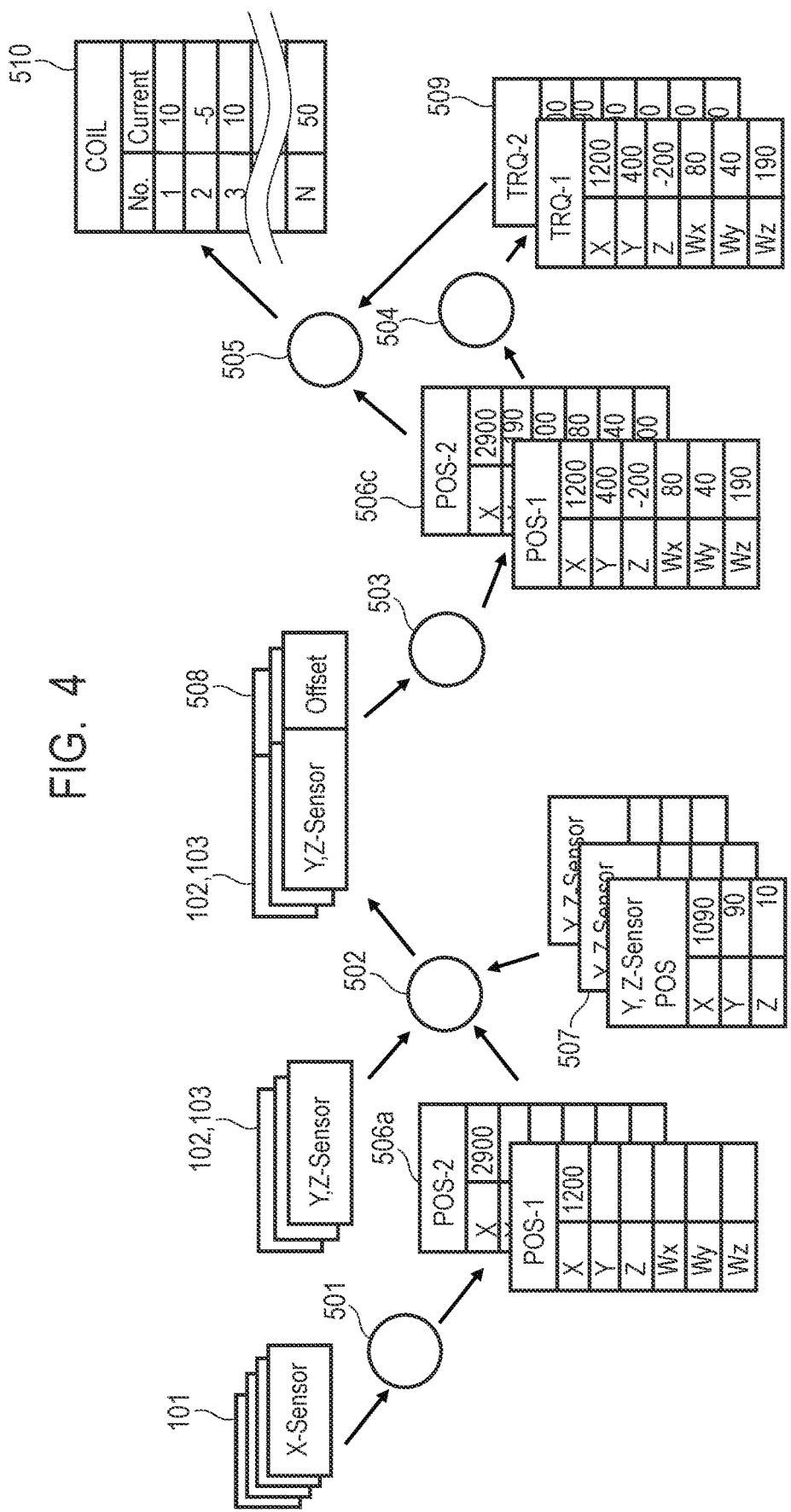
FIG. 4 is a schematic diagram illustrating a method of controlling the position of a mover in the transport apparatus according to the embodiment of the present invention.

The attitude control method of the mover 301 performed by the integration controller 401 will be described below with reference to FIG. 4. FIG. 4 is a schematic diagram illustrating the attitude control method of the mover 301 in the transport apparatus 1 according to the present embodiment. FIG. 4 illustrates the overview of the attitude control method of the mover 301 by mainly focusing on the data flow. The integration controller 401 performs processes using a mover position calculation function 501, a mover correction processing function 502, a mover attitude calculation function 503, a mover attitude control function 504, and a coil current calculation function 505, as described below. Accordingly, the integration controller 401 controls the transport of the mover 301 while controlling the attitude of the mover 301 in six axes. Note that, instead of the integration controller 401, the coil controller 402 can be configured to perform the same processing as the integration controller 401.

First, the mover position calculation function 501 calculates the number and position of the movers 301 on the stator 201 constituting the transport path based on the measured values from the plurality of X sensors 101 and the information on the mounting positions thereof. Thereby, the mover position calculation function 501 updates mover position information (X) and number information in the mover information 506a that is information on the mover 301. The mover position information (X) indicates the position in the X direction that is the transport direction of the mover 301 on the stator 201. The mover information 506a is prepared for each mover 301 on the stator 201 as indicated as POS-1, POS-2, . . . in FIG. 4, for example.

Next, the mover correction processing function 502 identifies the Y sensor 102 and the Z sensor 103 capable of measuring the respective mover 301 from the mover position information (X) of the mover information 506a updated by the mover position calculation function 501. At this time, the mover correction processing function 502 calculates a correction value (offset value) 508 for converting the detected value into a relative distance to the mover 301 based on sensor installation position information 507 on the stator 201 of the identified Y sensor 102 and the Z sensor 103 and the mover position information (X). Further, the mover correction processing function 502 adds the calculated correction value 508 to the detected value to convert it into the relative distance.

The mover attitude calculation function 503 calculates attitude information (Y, Z, Wx, Wy, Wz) based on the detected value outputted from the identified Y sensor 102 and Z sensor 103 and the correction value calculated by the mover correction processing function 502, and updates the mover information 506 to make it into the mover information 506c. The mover information 506c updated by the mover attitude calculation function 503 includes the mover position information (X) and the attitude information (Y, Z, Wx, Wy, Wz).

Next, the mover attitude control function 504 calculates the application force information 509 for each mover 301 from the current mover information 506c including the mover position information (X) and the attitude information (Y, Z, Wx, Wy, Wz) and an attitude target value. The application force information 509 is information related to the magnitude of force to be applied to each mover 301. The application force information 509 includes information related to three-axis components of force (Tx, Ty, Tz) and three-axis components of torque (Twx, Twy, Twz) of force T to be applied, which will be described later. The application force information 509 is prepared for each mover 301 on the stator 201 as indicated as TRQ-1, TRQ-2, . . . in FIG. 4, for example.

Next, the coil current calculation function 505 determines a current command value 510 to be applied to each coil 202 based on the application force information 509 and the mover information 506c.

In such a way, the integration controller 401 determines the current command value 510 by performing a process using the mover position calculation function 501, the mover correction processing function 502, the mover attitude calculation function 503, the mover attitude control function 504, and the coil current calculation function 505. The integration controller 401 transmits the determined current command value 510 to the coil controller 402.

Figure 5:
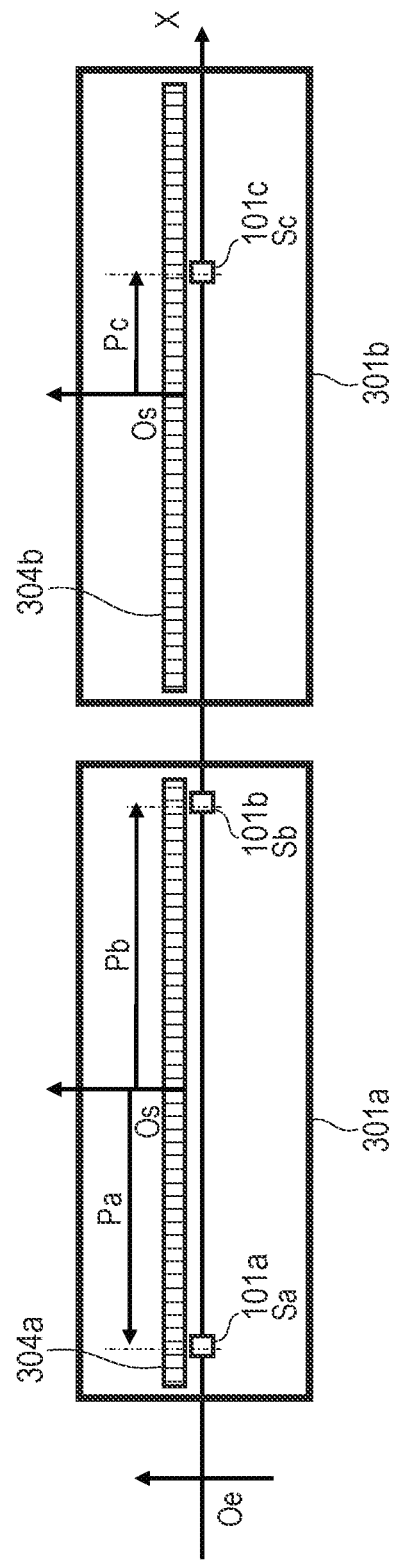
FIG. 5 is a schematic diagram explaining position detection in a transport direction in the transport apparatus according to the embodiment of the present invention.

The process in accordance with the mover position calculation function 501 will now be described with reference to FIG. 5. FIG. 5 is a schematic diagram for explaining the process in accordance with the mover position calculation function. FIG. 5 is a view illustrating the positional relationship between X linear scales 304a and 304b and X sensors 101a, 101b and 101c on the bottom surface of movers 301a and 301b when the movers 301a and 301b are viewed from the –Z direction.

In FIG. 5, the reference point Oe is a position reference of the stator 201 to which the X sensor 101 is attached. The reference point Os is a position reference of the X linear scale 304 attached to the mover 301. FIG. 5 illustrates a case where the two movers 301a and 301b are transported as the movers 301 and the three X sensors 101a, 101b and 101c are arranged as the X sensors 101. The X linear scales 304a and 304b are attached to the same positions of the movers 301a and 301b along the X direction.

For example, the single X sensor 101c faces the X linear scale 304b of the mover 301b illustrated in FIG. 5. The X sensor 101c reads the linear scale 304b of the mover 301b and outputs a distance Pc. Further, the position of the X sensor 101c on the X-axis whose origin is the reference point Oe is Sc. Therefore, the position Pos(301b) of the mover 301b can be calculated by the following Equation (1).

$$Pos(301b)=Sc-Pc \quad \text{Equation (1)}$$

For example, the two X sensors 101a and 101b face the X linear scale 304a of the mover 301a illustrated in FIG. 5. The X sensor 101a reads the X linear scale 304a of the mover 301a and outputs a distance Pa. The position of the X sensor 101a on the X-axis whose origin is the reference point Oe is Sa. Therefore, the position Pos(301a) of the mover 301a on the X-axis based on the output of the detected value of the X-sensor 101a can be calculated by the following Equation (2).

$$Pos(301a)=Sa-Pa \quad \text{Equation (2)}$$

In addition, the X sensor 101b reads the X linear scale 304a of the mover 301a and outputs a distance Pb. The position of the X sensor 101b on the X-axis whose origin is the reference point Oe is Sb. Therefore, the position Pos(301a)' of the mover 301a on the X-axis based on the output of the detected value of the X-sensor 101b can be calculated by the following Equation (3).

$$Pos(301a)'=Sb-Pb \quad \text{Equation (3)}$$

Herein, since the installation positions of the respective X sensors 101a and 101b have been measured accurately in advance, the difference between the two values Pos(301a) and Pos(301a)' is sufficiently small. When the difference between the positions of the mover 301 on the X-axis based on the outputs of the two X-sensors 101 is sufficiently small in such a way, it can be determined that these two X-sensors 101 are observing the X-linear scale 304 of the same mover 301.

Note that, when the plurality of X sensors 101 face the same mover 301, it is possible to uniquely determine the position of the observed mover 301 by, for example, calculating the average value of the positions based on the outputs of the plurality of X sensors 101, or the like. Alternatively, the position based on the output of the detected value of any of the X sensors 101 may be determined as the position of the mover 301.

The mover position calculation function 501 calculates and determines the position X of the mover 301 in the X direction as the mover position information based on the output of the X sensor 101 as described above. The mover correction processing function 502 identifies the Y sensor 102 and the Z sensor 103 capable of measuring the respective movers 301 from the mover position information (X) of the mover information 506a updated by the mover position calculation function 501.

Figure 6:
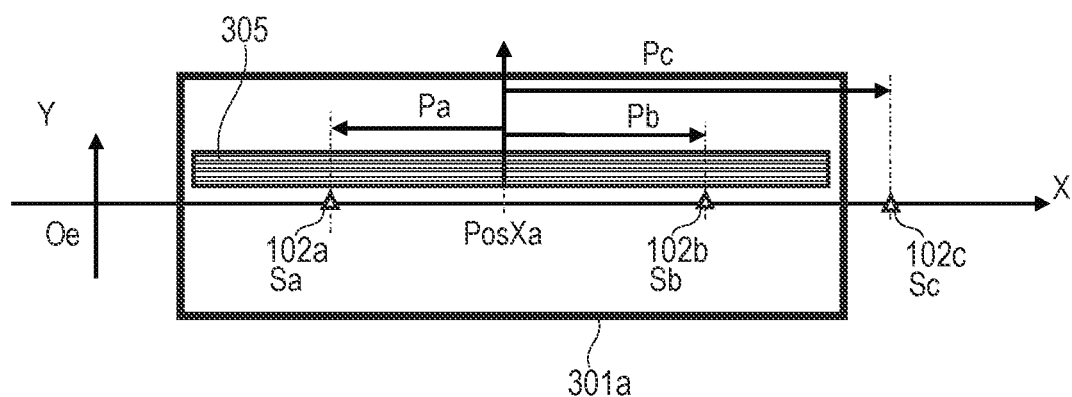
FIG. 6 is a schematic diagram illustrating a mover correction process in a direction orthogonal to the transport direction in the transport apparatus according to the embodiment of the present invention.

Next, the process in accordance with the mover correction processing function 502 will be described with reference to FIG. 6. FIG. 6 is a diagram illustrating the positional relationship between the Y linear scale 305 and the Y sensors 102a, 102b, and 102c on the bottom surface of the mover 301a when the mover 301a is viewed from the –Z direction.

For example, for the mover 301a illustrated in FIG. 6, the mover position information (X) is calculated as PosXa. The mover correction processing function 502 identifies the two Y sensors 102a and 102b as the Y sensors 102 that are capable of measuring the mover 301a based on the relationship between PosXa and Sa and Sb of sensor installation position information 507 indicating the installation positions of the Y sensors 102a and 102b. In addition, the mover correction processing function 502 identifies the Y sensor 102c as the Y sensor 102 that is to be capable of measuring the mover 301a based on the relationship between PosXa and Sc, which is the sensor installation position information 507 indicating the installation position of the Y sensor 102c. Here, the Y sensor 102c that is to be capable of measuring is the Y sensor 102 that will become capable of measuring the mover 301a when the mover 301a is transported, for example, in the +X direction.

The mover correction processing function 502 converts the detected values of the Y linear scale 305 of the two Y sensors 102a and 102b that is capable of measuring and the Y sensor 102c that is to be capable of measuring identified as described above into the relative distances to the mover 301a in the Y direction. The mover correction processing function 502 outputs correction values 508 including the relative distances to the mover 301a in the Y direction obtained by converting the detected values of the Y sensors 102a, 102b, and 102c, respectively.

Figure 7:
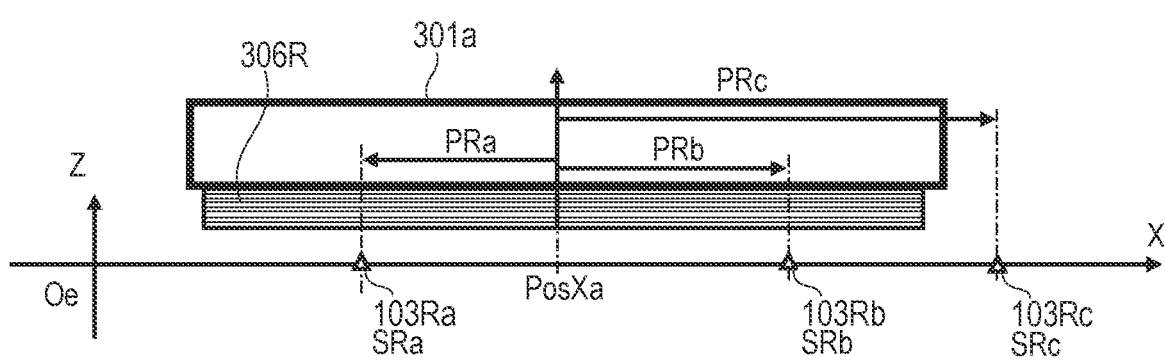
FIG. 7 is a schematic diagram illustrating a mover correction process in a direction different from that in FIG. 6 orthogonal to the transport direction in the transport apparatus according to the embodiment of the present invention.

The mover correction processing function 502 performs the same process for the Z sensor 103. Note that although a case with the Z sensor 103 on the R side will be described below as an example, the same process can be performed on the Z sensor 103 on the L side. FIG. 7 is a diagram illustrating the positional relationship between the Z linear scale 306R and the Z sensors 103Ra, 103Rb, and 103Rc on the bottom surface of the mover 301a when the mover 301a is viewed from the −Y direction.

For example, for the mover 301a illustrated in FIG. 7, the mover position information (X) is calculated as PosXa. The mover correction processing function 502 identifies the two Z sensors 103Ra and 103Rb as the Z sensors 103 that are capable of measuring the mover 301a based on the relationship between PosXa, and SRa and SRb of sensor installation position information 507 indicating the installation positions of the Z sensors 103Ra and 103Rb, respectively.

In addition, the mover correction processing function 502 identifies the Z sensor 103Rc as the Z sensor 103 that is to be capable of measuring the mover 301a based on the relationship between PosXa and SRc, which is sensor installation position information 507 indicating the installation position of the Z sensor 103Rc. Here, the Z sensor 103Rc that is to be capable of measuring is the Z sensor 103 that will become capable of measuring the mover 301a when the mover 301a is transported, for example, in the +X direction.

The mover correction processing function 502 converts the detected values of the Z linear scale 306R of the two Z sensors 103Ra and 103Rb that are capable of measuring and the Z sensor 103Rc that is to be capable of measuring identified as described above into the relative distances to the mover 301a in the Z direction. The mover correction processing function 502 outputs correction values 508 including the relative distances to the mover 301a in the Z direction obtained by converting the detected values of the Z sensors 103Ra, 103R, and 102Rc, respectively.

The relative distances between the respective sensors and the mover 301 calculated by the mover correction processing function 502 is used by the mover attitude calculation function 503 to calculate the attitude information of the mover 301. Thus, even when the sensor used for calculating the mover information 506 is switched by the transport of the mover 301, it is possible to continuously calculate the mover information 506 including the position and attitude of the mover 301.

Figure 8A:
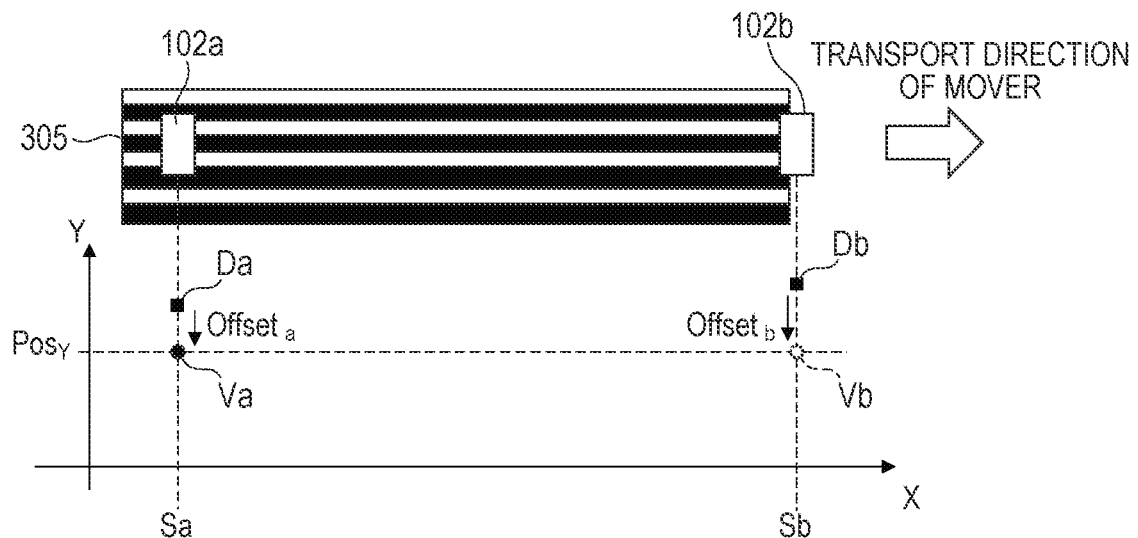
FIG. 8A is a schematic diagram illustrating acquisition of a correction value for converting a detection value of a sensor in the direction orthogonal to the transport direction to a relative distance to the mover in the transport apparatus according to the embodiment of the present invention.
Figure 8B:
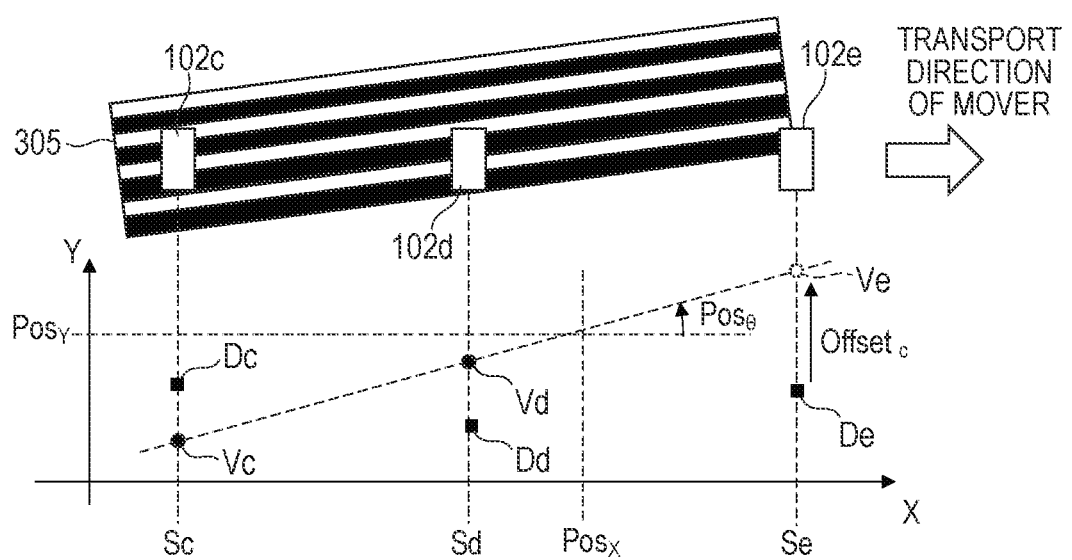
FIG. 8B is a schematic diagram illustrating acquisition of a correction value for converting a detection value of a sensor in the direction orthogonal to the transport direction to a relative distance to the mover in the transport apparatus according to the embodiment of the present invention.

Note that the Y sensor 102 starts to detect the Y linear scale 305 of the mover 301, which has not been detected before, in accordance with the transport of the mover 301 in the X direction. The detected value of the Y sensor 102 starting to detect the Y linear scale 305 can be converted into a relative distance to the mover 301 by using a corrected value. The correction value used for this conversion can be set based on the relative distances to the mover 301 calculated from the detection values of the plurality of Y sensors 102 capable of detecting the Y linear scale 305. Hereinafter, a method of obtaining the correction value used for converting the detected value of the Y sensor 102 into the relative distance to the mover 301 will be described with reference to FIG. 8A to FIG. 8D. FIG. 8A to FIG. 8D illustrates the Y linear scale 305 of the mover 301, the Y sensors 102, and the like. In FIG. 8A and FIG. 8B, the main body of the mover 301 is omitted.

For example, as illustrated in FIG. 8A and FIG. 8B, the Y sensors 102b and 102e of the plurality of Y sensors 102 start to detect the Y linear scale 305 of the mover 301 when the mover 301 is transported in the X direction. The Y sensor 102b starts to detect the Y linear scale 305 when the Y sensor 102a is detecting the Y linear scale 305. The Y sensor 102e starts to detect the Y linear scale 305 when the Y sensors 102c and 102d are detecting the Y linear scale 305. The detected values of the Y sensors 102b and 102e can be converted into relative distances to the mover 301 by using correction values set on the basis of relative distances to the mover 301 calculated based on the detected values of the plurality of Y sensors 102 capable of detecting the Y linear scale 305.

In the examples illustrated in FIG. 8A and FIG. 8B, the Y linear scale 305 of the mover 301 is moved as the mover 301 is transported along the X direction which is the transport direction. At this time, each of the detected values Da to De of the Y sensors 102a to 102e vary due to the effects of variations in the installation of the Y sensors 102a to 102e, noise at the start of detecting the Y linear scale 305, and the like.

First, a method of setting an initial value of the correction value of the Y sensor 102 will be described with reference to FIG. 8C. The initial value of the correction value can be set for each of the Y sensors 102 as follows.

Figure 8C:
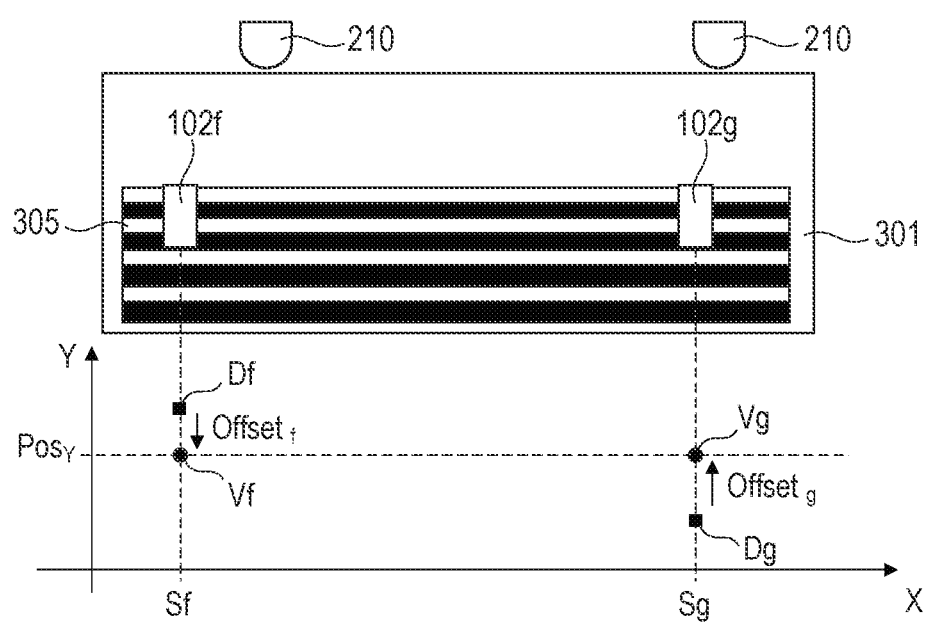
FIG. 8C is a schematic diagram illustrating acquisition of a correction value for converting a detection value of a sensor in the direction orthogonal to the transport direction into a relative distance to the mover in the transport apparatus according to the embodiment of the present invention.

For example, as illustrated in FIG. 8C, the mover 301 is arranged at a predetermined position where the Y sensors 102f and 102g, for which the initial values of the correction value are to be set, can detect the Y linear scale 305, and the mover 301 is regulated in the Y direction by butting structures 210. At this time, the mover 301 can be regulated in the Y direction so that the relative distance between the Y sensors 102f and 102g and the mover 301 becomes, for example, zero as a known value. In this state, the Y linear scale 305 is detected by the Y sensors 102f and 102g. Alternatively, instead of detecting under the regulation in the Y direction, the Y linear scale 305 can be detected by the Y sensors 102f and 102g, and the mover 301 at a predetermined position can be separately measured by another Y sensor capable of measuring an absolute value of a distance such as an eddy current sensor. Based on the detected values Df and Dg of the Y sensors 102f and 102g thus obtained and the known values of the relative distances or the measured values of other Y sensors, correction values $Offset_f$ and $Offset_g$ for converting the detected values Df and Dg into relative distances Vf and Vg to the mover 301 can be obtained. For the other Y sensors 102a and 102b, and the like, similarly, correction values $Offset_a$, $Offset_b$, and the like for converting the detected values Da, Db, and the like into the relative distances Va, Vb, and the like can be obtained.

For example, in the method of regulating the mover 301 in the Y direction by the butting structures 210 illustrated in FIG. 8C, using the detected values Df and Dg at a predetermined butting position, the correction values $Offset_f$ and $Offset_g$ for converting into the relative distances Vf and Vg can be obtained as follows.

$\text{Offset}_f = -Df$ $\text{Offset}_g = -Dg$

Note that the above description illustrates n example in which the two Y sensors 102f and 102g detect the Y linear scale 305 at a predetermined position and the relative distance is set to zero at the butting position, but the embodiment is not limited to this example. It is also possible to set the correction value so as to output a desired relative distance at the butting position. In addition, the correction value may be calculated by taking into account the detection position of the Y sensor 102 at the predetermined position, the attitude θ (angle deviation at the butting position) which is the amount of rotation of the mover 301 around the Z-axis at the butting position, and the like.

Next, a process including the setting of correction values when the Y sensors 102b and 102e start to detect the Y linear scale 305 moving with the transport of the mover 301 along the X direction will be described with reference to FIG. 8A and FIG. 8B.

FIG. 8A illustrates an example of a case where the Y linear scale 305 moves along the X direction, which is the transport direction, with the transport of the mover 301 along the X direction, or a case where the inclination of the mover 301 or the Y linear scale 305 at the time of transport of the mover 301 is not taken into consideration. In FIG. 8A, the Y sensors 102a and 102b are installed at positions Sa and Sb in the X direction, respectively.

In the case illustrated in FIG. 8A, the detected value Da of the Y sensor 102a is converted into a relative distance Va to the mover 301 by using the corrected value $\text{Offset}_a$. The position Y of the mover 301 in the Y direction is calculated as $\text{Pos}_Y = Va$ based on the relative distance Va. When the Y sensor 102b can detect the Y linear scale 305 in accordance with the transport of the mover 301 in the X direction, the correction value $\text{Offset}_b$ of the Y sensor 102b can be set as follows, for example, based on $\text{Pos}_Y$, which is the position Y of the mover 301.

$\text{Offset}_b = \text{Pos}_Y - Db$

By setting the correction value in this way, it is also possible to calculate the relative distance Vb to the mover 301 with the Y sensor 102b.

Thus, the relative distance Vb, which is the position information of the mover 301 based on the detection value Db of the Y sensor 102b, is corrected based on the relative distance Va, which is the position information of the mover 301 based on the detection value Da of the other Y sensor 102a. Therefore, in the present embodiment, the initial value of the encoder does not become indefinite when the Y sensor 102 for detecting the Y linear scale 305 is switched, and the position and attitude of the mover 301 can be detected in a wide range and with high accuracy.

In addition, the Y sensors 102 may not be arranged at intervals smaller than the length of the Y linear scale 305. FIG. 8D illustrates an example in which the Y sensors 102 cannot be arranged at intervals shorter than the length of the Y linear scale 305. In FIG. 8D, the Y sensors 102h and 102j adjacent to each other in the X direction are arranged at an interval wider than the length of the Y linear scale 305.

In the case illustrated in FIG. 8D, the mover 301 is regulated in the Y direction in a section from a position PosXh of the mover 301 where the Y sensor 102h stops detecting the Y linear scale 305 to a position PosXj where the Y sensor 102j starts to detect the Y linear scale 305. Specifically, for example, the mover 301 is regulated in the Y direction by positioning mechanisms 211 for regulating the position of the mover 301 in the Y direction. Thus, the position of the mover 301 in the Y direction in the section from PosXh to PosXj can be guaranteed.

By guaranteeing the position in the Y direction, at the position PosXh in the X direction of the mover 301, the relative distance Vh to the mover 301 is obtained based on the detected value Dh of the Y sensor 102h, and the position $\text{Pos}_Y (=Vh)$ in the Y direction of the mover 301 is calculated. Then, in the Y sensor 102j starting to detect the Y linear scale 305, the correction value $\text{Offset}_j$ of the Y sensor 102j can be set as follows, for example, by using the detection value Dj of the Y sensor 102j.

$\text{Offset}_j = \text{Pos}_Y - Dj$

Thus, the relative distance Vj to the mover 301 can be calculated even at the position PosXj of the mover 301 in the X direction.

Note that, in the case illustrated in FIG. 8D, an example of regulation in the Y direction by the positioning mechanisms 211 are illustrated, but the position in the Y direction of the mover 301 in the section from PosXh to PosXj may be guaranteed by detecting and controlling the position in the Y direction of the mover 301 by arranging a different sensor.

FIG. 8B illustrates an example in which the Y linear scale 305 is moved at an inclination of Pose with respect to the X direction in accordance with the transport of the mover 301. In FIG. 8B, the Y sensors 102c, 102d, and 102e are installed at positions Sc, Sd, and Se in the X direction, respectively.

In the case illustrated in FIG. 8B, the position of the mover 301 in the Y direction is calculated as $\text{Pos}_Y$ and the attitude θ of the mover 301 is calculated as $\text{Pos}_\theta$ based on the relative distances Vc and Vd to the mover 301 calculated based on the detection values Dc and Dd of the Y sensors 102c and 102d, respectively. The position of the mover 301 in the X direction is calculated as $\text{Pos}_X$ by the output of the X sensor 101. When the Y sensor 102e can detect the Y linear scale 305 in accordance with the transport of the mover 301, the correction value $\text{Offset}_e$ of the Y sensor 102e can be set as follows based on the position $\text{Pos}_Y$ and the attitude $\text{Pos}_\theta$.

$\text{Offset}_e = \text{Pos}_Y + \text{Pos}_\theta * (Se - \text{Pos}_X) - De$

Thus, it is also possible with the Y sensor 102e to calculate the relative distance Ve to the mover 301.

In this way, the relative distance Ve, which is the position information of the mover 301 based on the detected value De of the Y sensor 102e, is corrected based on the relative distances Vc and Vd, which are the position information of the mover 301 based on the detected values Dc and Dd of the other Y sensors 102c and 102d. Therefore, in the present embodiment, the initial value of the encoder does not become indefinite when the Y sensor 102 for detecting the Y linear scale 305 is switched, and the position and attitude of the mover 301 can be detected in a wide range and with high accuracy.

Figure 9A:
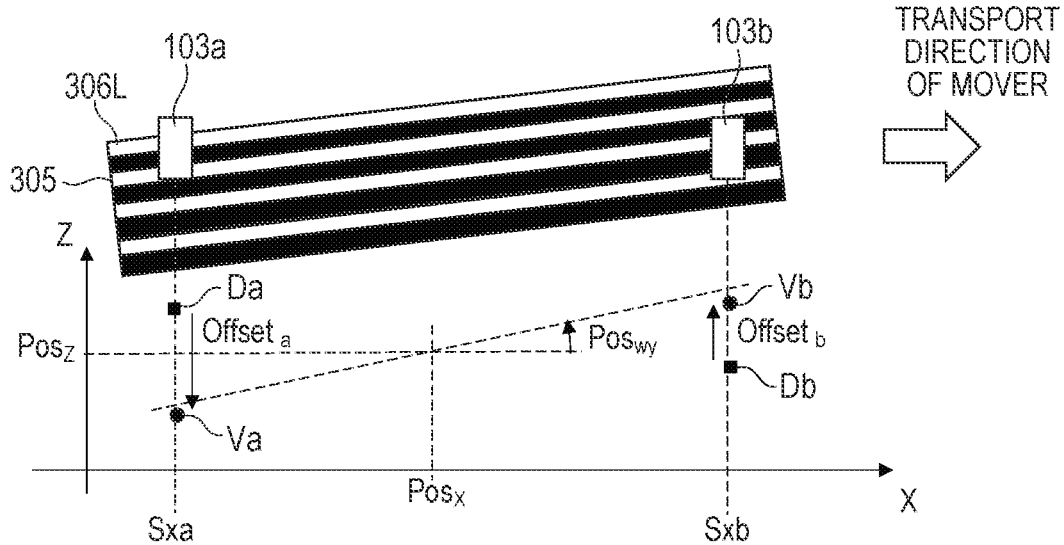
FIG. 9A is a schematic diagram illustrating acquisition of a correction value for converting a detection value of a sensor in a direction different from that of FIG. 8A to FIG. 8D orthogonal to the transport direction into a relative distance to the mover in the transport apparatus according to the embodiment of the present invention.
Figure 9B:
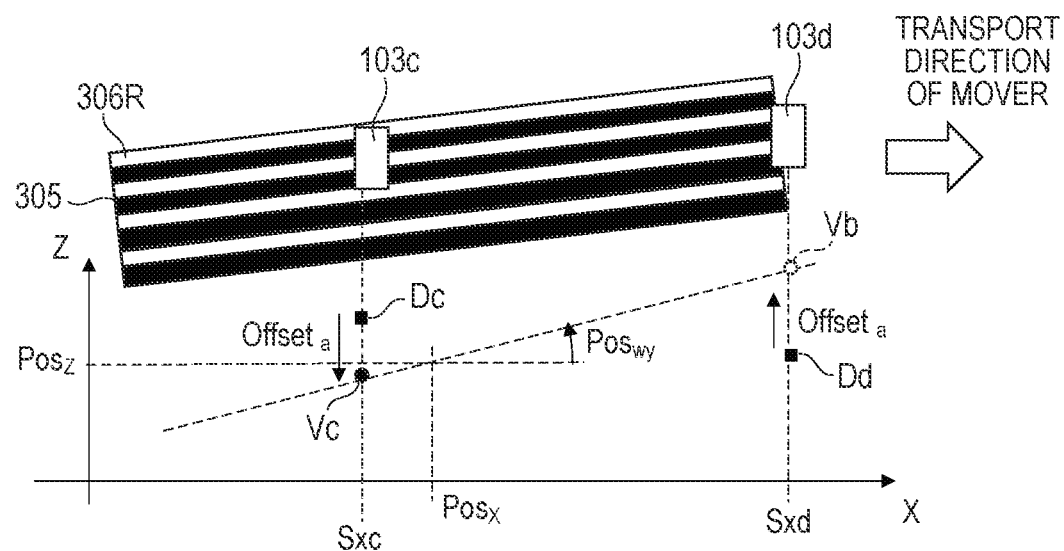
FIG. 9B is a schematic diagram illustrating acquisition of a correction value for converting a detection value of a sensor in the direction different from that of FIG. 8A to FIG. 8D orthogonal to the transport direction into a relative distance to the mover in the transport apparatus according to the embodiment of the present invention.
Figure 9C:
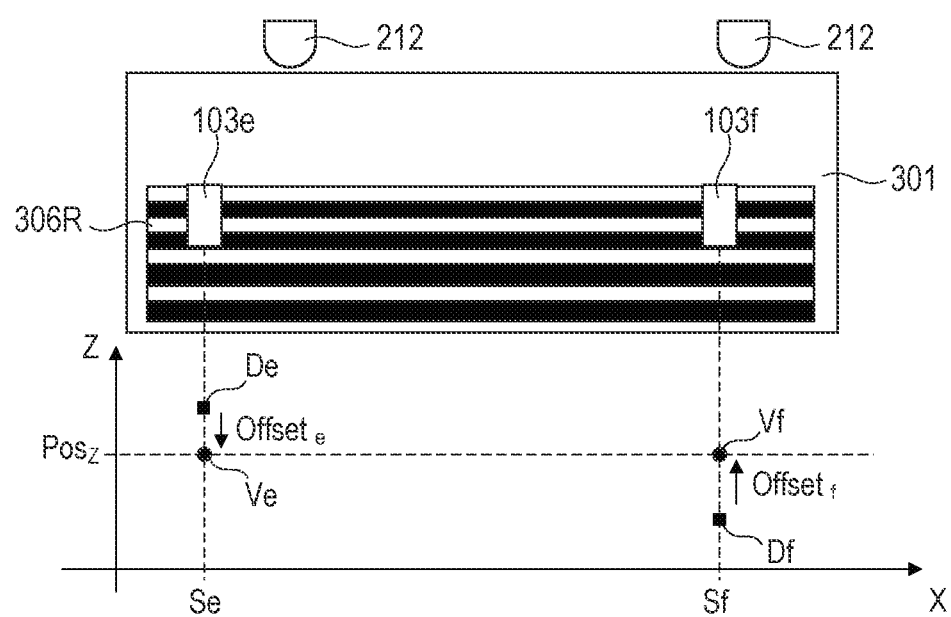
FIG. 9C is a schematic diagram illustrating the acquisition of a correction value for converting a detection value of a sensor in a direction different from FIG. 8A to FIG. 8D orthogonal to a transport direction in a transport apparatus according to the embodiment of the present invention into a relative distance to a mover.

Similarly to the Y sensor 102, a correction value used for converting the detected value of the Z sensor 103 into a relative distance to the mover 301 can be set. Hereinafter, a method of obtaining the correction value used for converting the detected value of the Z sensor 103 into the relative distance to the mover 301 will be described with reference to FIG. 9A to FIG. 9C. FIG. 9A to FIG. 9C illustrate the Z linear scale 306 of the mover 301, the Z sensor 103, and the like. In FIG. 9A and FIG. 9B, the main body of the mover 301 is omitted.

FIG. 9A to FIG. 9C illustrate an example in which the Z linear scales 306R and 306L move along the X direction in which the mover 301 is transported. FIG. 9A illustrates a case where the Z linear scale 306L installed on the +Y side of the mover 301 is detected by the Z sensors 103a and 103b. FIG. 9B illustrates a case where the Z linear scale 306R installed on the −Y side of the mover 301 is detected by the Z sensors 103c and 103d. FIG. 9C illustrates a case where the mover 301 is regulated in the Z direction at a butting position. At this time, the detected values Da to Df of the Z sensors 103a to 103f vary due to variations in the installation positions of the Z sensors 103a to 103f, noise at the start of detecting the Z linear scale 306, and the like.

First, a method of setting an initial value of the correction value of the Z sensor 103 will be described with reference to FIG. 9C. The initial value of the correction value can be set for each of Z sensors 103 as follows.

For example, as illustrated in FIG. 9C, the mover 301 is arranged at a predetermined position where the Z sensors 103e and 103f for which the initial values of the correction values are to be set can detect the Z linear scale 306R, and the mover 301 is regulated in the Z direction by the butting structures 212. At this time, the mover 301 can be regulated in the Z direction so that the relative distances from the Z sensors 103e and 103f to the mover 301 become, for example, zero as a known value. In this state, the Z linear scale 306R is detected by Z sensors 103e and 103f. Alternatively, another Z sensor, such as an eddy current sensor or the like, capable of measuring the absolute value of the distance can separately measure the mover 301 at a predetermined position.

Corrected values $Offset_e$ and $Offset_f$ for converting the detected values De and Df into relative distances Ve and Vf to the mover 301 can be obtained based on the detected values De and Df of the Z sensors 103e and 103f thus obtained and the known values of the relative distances or the measured values of the other Z sensors. Note that for other Z sensors 103a, 103b and the like, similarly, correction values $Offset_a$, $Offset_b$ and the like for converting the detected values Da, Db and the like into the relative distances Va, Vb and the like can be obtained. The correction value of the Z sensor 103 for detecting the L side Z linear scale 306L can be obtained by the same method as that of the R side Z sensor 103.

For example, in the method of regulating the mover 301 in the Z direction by the butting structures 212 illustrated in FIG. 9C, the correction values $Offset_e$ and $Offset_f$ for converting into the relative distances Ve and Vg can be obtained by using the detected values De and Df at the predetermined butting position.

$$Offset_e = -De$$

$$Offset_f = -Df$$

Note that the above description illustrates the example in which the Z sensors 103e and 103f detect the Z linear scale 306R at a predetermined position and the relative distances are set to zero at the butting position, but the embodiment is not limited thereto. It is also possible to set the correction value so as to output a desired relative distance at the butting position. Further, the correction value may be calculated by taking into account the detection position of the Z sensor 103 at the predetermined position, and the attitudes $Pos_{wx}$ and $Pos_{wy}$ (variations in the horizontal degree at the butting position) which are the rotation amounts of the mover 301 around the X-axis and Y-axis at the butting position, and the like.

Next, a process including the setting of a correction value when the Z sensor 103d starts to detect the Z linear scale 306R moving with the transport of the mover 301 along the X direction will be described with reference to FIG. 9A and FIG. 9B. In FIG. 9A and FIG. 9B, the Z sensors 103a, 103b, 103c, and 103d are installed at positions Sxa, Sxb, Sxc, and Sxd in the X direction, respectively. The Z sensor 103d starts to detect the Z linear scale 306R when the Z sensors 103a and 103b are detecting the Z linear scale 306L and the Z sensor 103c is detecting the Z linear scale 306R.

As illustrated in FIG. 9A and FIG. 9B, the detected values Da, Db, and Dc of the Z sensors 103a, 103b, and 103c are converted into relative distances Va, Vb, and Vc with to the mover 301 by using the correction values $Offset_a$, $Offset_b$, and $Offset_c$, respectively. On the basis of the relative distances Va, Vb and Vc, the position Z in the Z direction of the mover 301 and the attitudes Ox and Oy, which are rotation amounts around the X-axis and around the Y-axis, are calculated as $Pos_z$, $Pos_{wx}$, and $Pos_{wy}$, respectively.

When the Z sensor 103d becomes capable of detecting the Z linear scale 306R in accordance with the transport of the mover 301, the correction value $Offset_d$ of the Z sensor 103d can be set as follows, for example, based on the position and the attitudes $Pos_z$, $Pos_Y$, $Posw_x$, and $Pos_{wy}$ of the mover 301.

$$Offset_d = Pos_Z + Pos_{wx}*(Sxd - Pos_X) + Pos_{wy}*(Syd - Pos_Y) - Dd$$

By setting the correction value in this way, the relative distance Vd to the mover 301 can also be calculated with the Z sensor 103d. Here, Sxd is the installation position of the Z sensor 103d in the X direction, and Syd is the installation position of the Z sensor 103d in the Y direction. $Pos_X$ is the position of the mover 301 in the X direction. $Pos_Y$ is the position of the mover 301 in the Y direction.

Thus, the relative distance Vd, which is the position information of the mover 301 based on the detection value Dd of the Z sensor 103d, is corrected based on the relative distances Va, Vb, and Vc, which are the position information of the mover 301 based on the detection values Da, Db, and Dc of the other Z sensors 103a, 103b, and 103c. Therefore, in the present embodiment, when the Z sensor 103 for detecting the Z linear scale 306 is switched, the initial value of the encoder does not become indefinite, and the position and attitude of the mover 301 can be detected in a wide range and with high accuracy.

Note that, in the above example, the correction value of the Z sensor 103d is set so that the detected value of the Z sensor 103d is converted into a value on the regression plane calculated from the relative distances detected by the Z sensors 103a, 103b, and 103c, but the embodiment is not limited thereto. For example, the correction value may be set so that the detected value is converted to a value on a regression line calculated from the relative distance of the Z sensor 103 detecting only one of the Z linear scales 306R and 306L. At this time, when the inclination of the mover 301 is also considered, it is desirable that the Z linear scale 306 on one side is detected by at least two Z sensors 103.

Further, the above description illustrates the example in which only the Z sensor 103d newly starts to detect the R side Z linear scale 306R, but the embodiment is not limited thereto. In a case where another Z sensor 103 newly starts to detect the Z linear scale 306L on the L side, or where a plurality of Z sensors 103 simultaneously start to detect the Z linear scales 306R and 306L on the R and L sides, the correction value can be obtained in the same manner. Thus, even in these cases, the relative distance of the Z sensor 103 to the mover 301 can be calculated.

The mover correction processing function 502 can convert the detected values of the Y sensor 102 and the Z sensor 103 into the relative distances to the mover 301 by using the correction values set for the Y sensor 102 and the Z sensor 103 as described above. Note that the mover correction processing function 502 may set the correction value for either one of the Y sensor 102 and the Z sensor 103 and convert the detected value into a relative distance, if necessary.

Next, the processing performed by the mover attitude calculation function 503 will be described with reference to FIG. 10 to FIG. 11B. FIG. 10 to FIG. 11B are schematic diagrams for explaining the processing performed by the mover attitude calculation function 503. The mover attitude calculation function 503 calculates the position and attitude of the mover 301 using the position X of the mover 301 in the X direction obtained as described above and the relative distances of the Y sensor 102 and the Z sensor 103 to the mover 301.

FIG. 10 illustrates a case where a mover 301c is transported as the mover 301 and Y sensors 102a, 102b, and 102c are arranged as the Y sensor 102. The three Y sensors 102a, 102b, and 102c face the Y linear scale 305c of the mover 301c. Here, the detection values output by the three Y sensors 102a, 102b, and 102c are referred to as Ya, Yb, and Yc, respectively. In addition, the relative distances of the Y sensors 102a, 102b, and 102c to the mover 301c calculated by converting the detected values of the Y sensors 102a, 102b, and 102c is indicated by black circles in the figure. Then, the position Y of the mover 301c in the Y direction and the rotation amount Wz around the Z-axis can be considered as the intercept and slope of a regression line.

The parameters a and b of the regression line Y=a*X+b indicating the mover position information (Y, Wz) can be calculated, for example, by using the least squares method, as a and b that minimize the square error E1 with the load shown in the following Equation (4). In this case, the slope a of the regression line is tan (Wz) and the intercept b is position Y. In Equation (4), Pa, Pb, and Pc are positions in the X direction of the Y sensors 102a, 102b, and 102c viewed from the center of the mover 301c located at a position PosXc in the X direction, respectively.

$$E1 = (Ya-(a*Pa+b))^2 + (Yb-(a*Pb+b))^2 + (Yc-(a*Pc+b))^2 \quad \text{Equation (4)}$$

If at least two Y sensors 102 face the Y linear scale 305, the mover position information (Y, Wz) of the mover 301 can be calculated, but as described above, three or more Y sensors 102 may face the Y linear scale 305 depending on the position of the mover 301. In such a case, the inclination of the Y linear scale 305, that is, the amount of rotation Wz of the mover 301 around the Z-axis, and the position Y of the mover 301 in the Y direction can also be calculated by using the least squares method or the like.

Figure 11A:
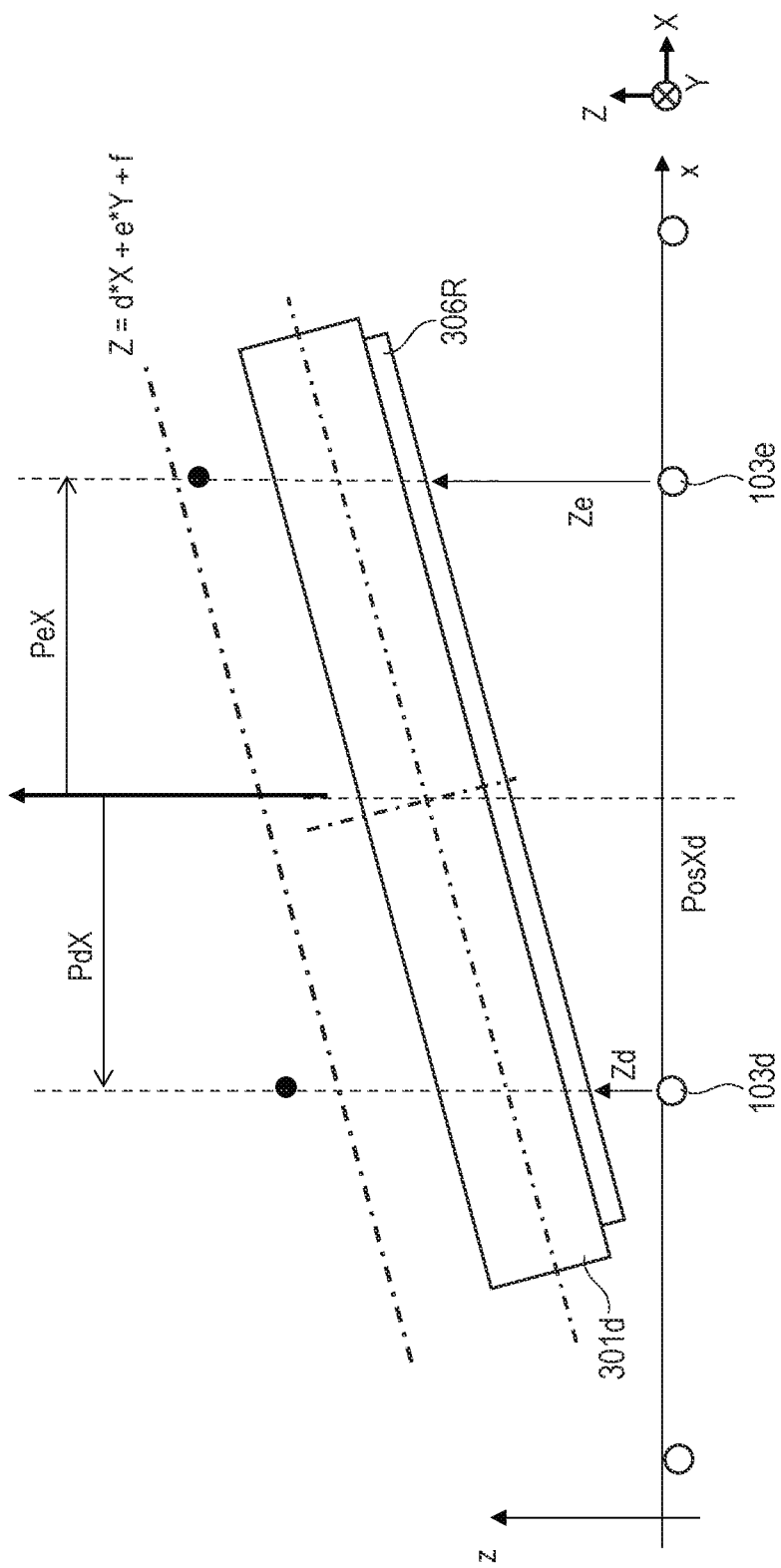
FIG. 11A is a schematic diagram illustrating a mover attitude calculation process in a direction different from that of FIG. 10 orthogonal to the transport direction in the embodiment of the present invention.
Figure 11B:
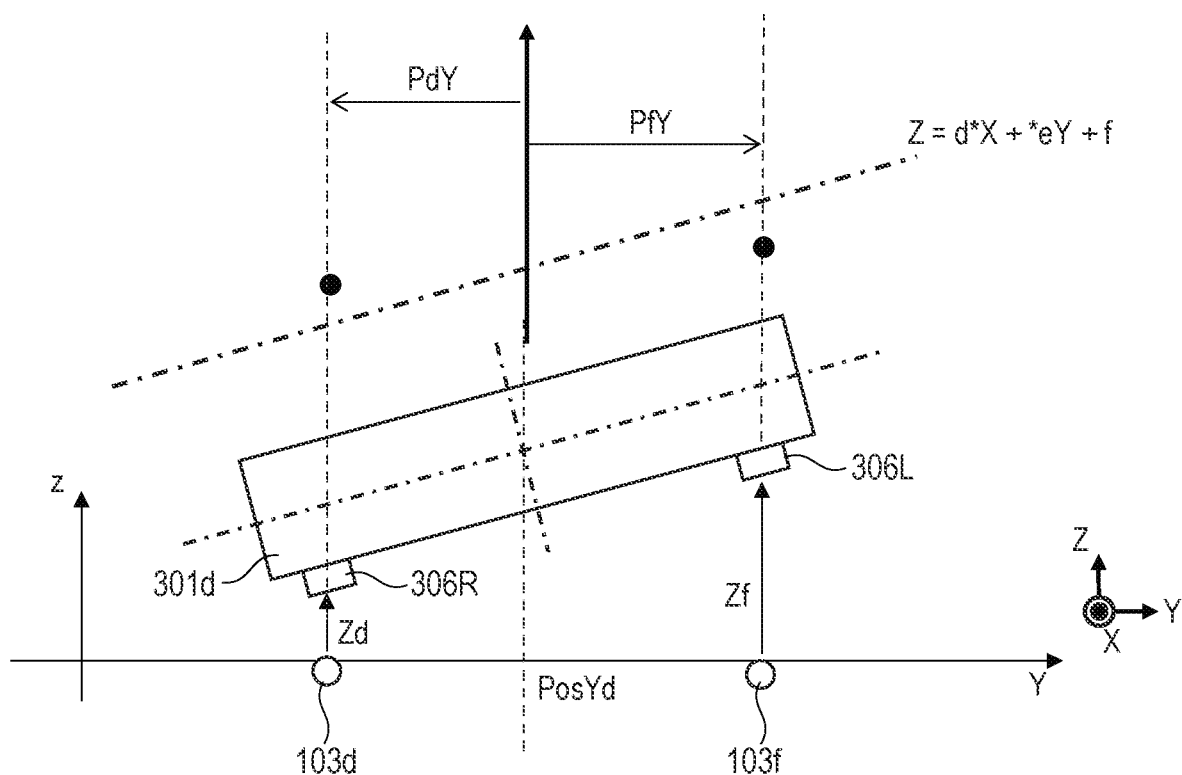
FIG. 11B is a schematic diagram illustrating a mover attitude calculation process in a direction different from that of FIG. 10 orthogonal to the transport direction in the embodiment of the present invention.

FIG. 11A and FIG. 11B illustrate a case where a mover 301d is transported as the mover 301 and Z sensors 103d, 103e and 103f are arranged as the Z sensor 103. The three Z sensors 103d, 103e, 103f face the Z linear scale 306 of the mover 301d. That is, the Z sensors 103d and 103e face the R side Z linear scale 306R, and the Z sensor 103f face the L side Z linear scale 306L. Here, the detection values output by the three Z sensors 103d, 103e, and 103f are Zd, Ze, and Zf, respectively. In addition, the relative distances to the mover 301d obtained by converting the detected values of the Z sensors 103d, 103e and 103f are indicated by black circles in the figure. Then, the position Z of the mover 301 in the Z direction, the rotation amount Wy around the Y-axis, and the rotation amount Wx around the X-axis can be determined as the respective parameters of a regression plane.

The parameters d, e, and f of the regression plane Z=d*X+e*Y+f indicating the mover position information (Z, Wx, Wy) can be calculated, for example, by using the least squares method, as d, e, and f that minimize the square error E2 with the load shown in the following Equation (5). In this case, d is tan (Wy), e is tan (Wx), and f is position Z. In the Equation (5), PdX and PeX are positions in the X direction of the Z sensors 103d and 103e viewed from the center of the mover 301d positioned at a position PosXd in the X direction, respectively. PdY and PfY are positions in the Y direction of the Z sensors 103d and 103f viewed from the center of the mover 301d located at the position PosYd in the Y direction, respectively.

$$E2 = (Zd-(d*PdX+e*PdY+f))^2 + (Ze-(d*PeX+e*PeY+f))^2 + (Zf-(d*PfX+e*PfY+f))^2 \quad \text{Equation (5)}$$

Note that, depending on the position of the mover 301, four or more Z sensors 103 may face the Z linear scale 306. In this case, the inclination of the Z linear scale 306, that is, the rotation amount Wx around the X-axis and the rotation amount Wy around the Y-axis, and the position Z of the mover 301 in the Z direction can also be calculated by using the least squares method or the like.

In addition, it is desirable that the Z sensor 103 is installed so as to be able to detect the Z linear scale 306 along the X direction, which is the transport direction, at least one on one of the R side and the L side and two on the other, from the viewpoint of the attitude detection accuracy of the mover 301. Although the present embodiment illustrates the example in which at least two Z sensors 103 are installed on the R side and at least one Z sensor 103 is installed on the L side, at least two Z sensors 103 may be installed on the L side and at least one Z sensor 103 may be installed on the R side.

As described above, the mover attitude calculation function 503 can calculate the position Y in the Y direction, the position Z in the Z direction, and the rotation amounts Wx, Wy, Wz around respective axes as the attitude information of the mover 301.

Using the mover information 506 calculated above, the mover attitude control function 504 calculates force T to be applied to the mover 301. The coil current calculation function 505 determines the amount of current to be applied to each coil 202 based on the force applied to each permanent magnet 303 when the force T is applied to the mover 301.

Next, a process in accordance with the coil current calculation function 505 will be described with reference to FIG. 2B. Note that, in the description of force used below, the directions in which the force in the X direction, the Y direction, and the Z direction act are denoted by x, y, and z, respectively, and the R side that is the −Y side in FIG. 2B is denoted by R, the L side that is the +Y side in FIG. 2B is denoted by L, the +X side in FIG. 2B is denoted by f, and the −X side in FIG. 2B is denoted by b.

In FIG. 2B, the forces acting on the permanent magnets 303 on the R side and the L side are described as follows. The force acting on each permanent magnet 303 is an electromagnetic force applied to the permanent magnet 303 by a plurality of coils 202 to which a current is applied. The permanent magnet 303 receives electromagnetic forces in the X direction, which is the transport direction of the mover 301, and in the Y and Z directions, which are different from the X direction, by a plurality of coils 202 to which a current is applied.

The force acting on the permanent magnet 303 on the R side is described as follows.

FzfR: force acting in the Z direction of the permanent magnet 303bR on the R side FxfR: force acting in the X direction of the permanent magnet 303bR on the R side FyfR: force acting in the Y direction of the permanent magnet 303aR on the R side FxbR: force acting in the X direction of the permanent magnet 303cR on the R side FybR: force acting in the Y direction of the permanent magnet 303dR on the R side FzbR: force acting in the Z direction of the permanent magnet 303cR on the R side The force acting on the permanent magnet 303 on the L side is described as follows.

FzfL: force acting in the Z direction of the permanent magnet 303bL on the L side FxfL: force acting in the X direction of the permanent magnet 303bL on the L side FyfL: force acting in the Y direction of the permanent magnet 303aL on the L side FxbL: force acting in the X direction of the permanent magnet 303cL on the L side FybL: force acting in the Y direction of the permanent magnet 303dL on the L side FzbL: force acting in the Z direction of the permanent magnet 303cL on the L side The force T applied to the mover 301 is represented by the following Equation (6). Tx, Ty, and Tz are three-axis components of force, and are an X direction component, a Y direction component, and a Z-direction component of the force, respectively. Twx, Twy and Twz are three-axis components of torque, and are a component around the X-axis, a component around the Y-axis, and a component around the Z-axis of torque, respectively. The transport apparatus 1 according to the present embodiment controls transport of the mover 301 while controlling the attitude of the mover 301 in six axes by controlling these six-axis components (Tx, Ty, Tz, Twx, Twy, Twz) of force T.

$$T=(Tx,Ty,Tz,Twx,Twy,Twz) \quad \text{Equation (6)}$$

Then, Tx, Ty, Tz, Twx, Twy and Twz are calculated by the following Equations (7a), (7b), (7c), (7d), (7e), and (7f), respectively.

$$Tx=FxfR+FxbR+FxfL+FxbL \quad \text{Equation (7a)}$$

$$Ty=FyfL+FyfR+FybL+FybR \quad \text{Equation (7b)}$$

$$Tz=FzbR+FzbL+FzfR+FzfL \quad \text{Equation (7c)}$$

$$Twx=\{(FzfL+FzbL)-(FzfR+FzbR)\}*ry3 \quad \text{Equation (7d)}$$

$$Twy=\{(FzfL+FzfR)-(FzbL+FzbR)\}*ry3 \quad \text{Equation (7e)}$$

$$Twz=\{(FyfL+FyfR)-(FybL+FybR)\}*rz3 \quad \text{Equation (7f)}$$

At this time, as for the force acting on the permanent magnet 303, limitations represented by the following Equations (7g), (7h), (7i), and (7j) can be introduced. By introducing these limitations, the combination of forces acting on the respective permanent magnets 303 to obtain the force T having predetermined six-axis components can be uniquely determined.

$$FxfR=FxbR=FxfL=FxbL \quad \text{Equation (7g)}$$

$$FyfL=FyfR \quad \text{Equation (7h)}$$

$$FybL=FybR \quad \text{Equation (7i)}$$

$$FzbR=FzbL \quad \text{Equation (7j)}$$

Next, a method in which the coil current calculation function 505 determines the amount of current applied to each coil 202 based on the force applied to each permanent magnet 303 will be described.

First, a case where force in the Z direction is applied to the permanent magnets 303a and 303d in which the N pole polarity and the S pole polarity are arranged alternately in the Y direction will be described. Note that the coils 202 are arranged so that their centers in the Z direction are positioned at the centers in the Y direction of the permanent magnets 303a and 303d. As a result, the permanent magnets 303a and 303d are hardly subjected to force acting in the X direction and the Z direction.

Assuming that X is the position of the mover 301, j is the number of the coil 202 arranged in a line, the magnitude of the force acting on the coil 202(j) in the Y direction per unit current is Fy(j, X), and the current applied to the coil 202(j) is i(j). Note that the coil 202(j) is the j-th coil 202. In this case, the current i(j) can be determined so as to satisfy the following Equation (8). Note that the following Equation (8) is an equation for the permanent magnet 303dR. For the other permanent magnets 303aR, 303aL, and 303dL, the current applied to the coil 202 can be determined in the same manner.

$$\Sigma Fy(j,X)*i(j)=FybR \quad \text{Equation (8)}$$

Note that, when the plurality of coils 202 apply force on the permanent magnet 303, the force acting on the permanent magnet 303 can be uniquely determined by prorating the current by the magnitude of the force per unit current according to the force applied by each coil 202.

As illustrated in FIG. 2B, the permanent magnets 303 are symmetrically arranged on the L side and the R side of the mover 301. Such a symmetrical arrangement of the permanent magnets 303 makes it possible to cancel multicomponent force acting on the permanent magnets 303, for example, such as force of Wx acting on the permanent magnets 303a and 303d, that is, a moment component around the X-axis, with the force on the L side and the R side. As a result, the attitude of the mover 301 can be controlled with higher accuracy.

Figure 12:
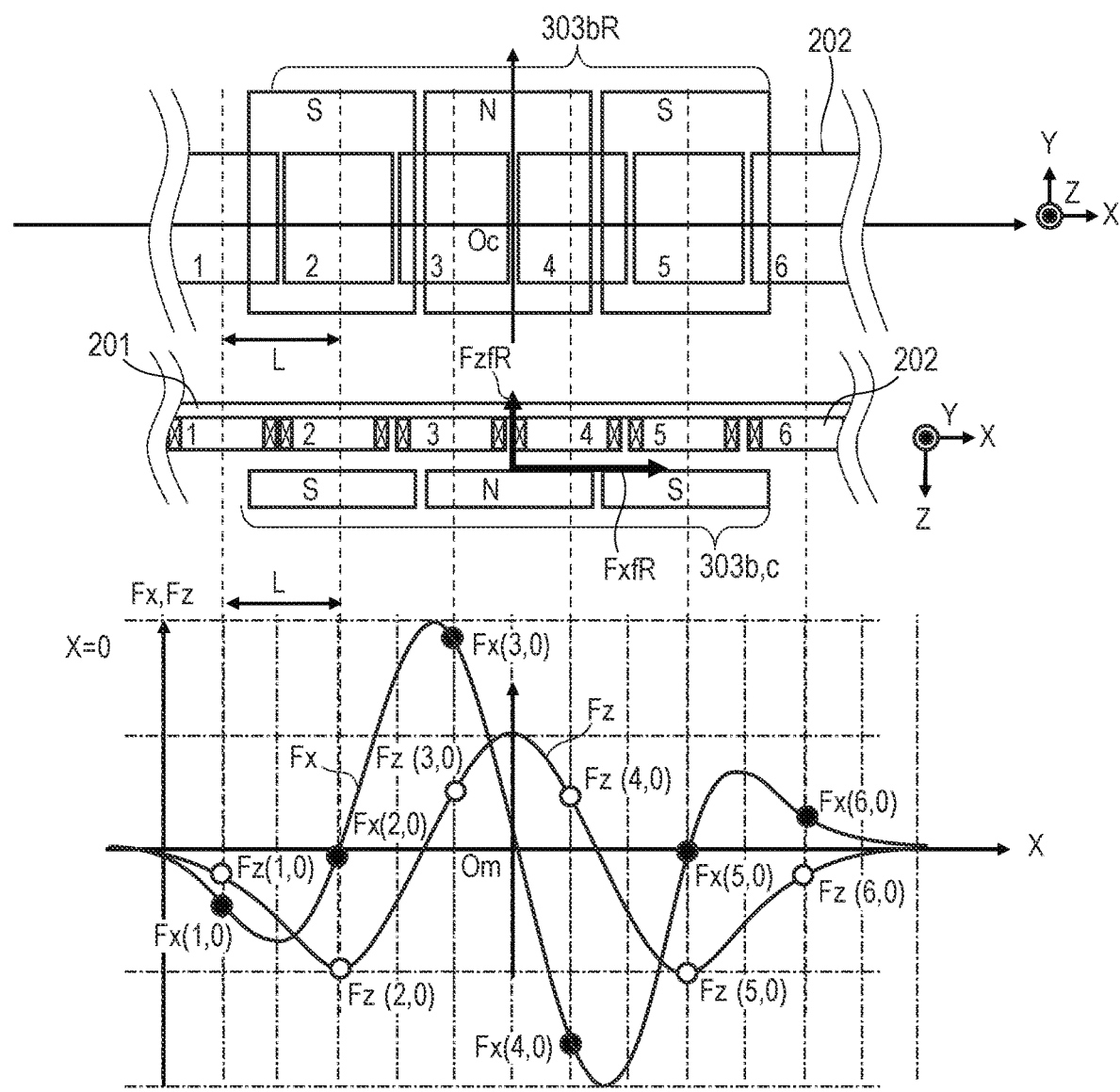
FIG. 12 is a schematic diagram explaining a method of independently applying force in X and Z directions to a permanent magnet in the transport apparatus according to the embodiment of the present invention.

Next, a method of applying force independently in the X direction and the Z direction to the permanent magnet 303b in which the N pole polarity, the S pole polarity and the N pole polarity are arranged alternately in the X direction will be described with reference to FIG. 12. FIG. 12 is a schematic diagram illustrating a method of applying force to the permanent magnet 303b independently in the X direction and the Z direction.

The coil current calculation function 505 determines a current command value to be applied to the coil 202 to apply force to the permanent magnet 303b independently in the X direction and the Z direction, in accordance with the following. Note that, as with the permanent magnet 303b, force can be applied to the permanent magnet 303c independently in the X direction and the Z direction.

Assuming that X is the position of the mover 301 and j is the number of the coils 202 arranged in a line, and the magnitudes of the force acting in the X direction of the coil 202(j) and the force acting in the Z direction of the coil 202(j) per unit current are Fx(j, X) and Fz(j, X), respectively.

Assuming that the magnitude of the current of the coil 202(j) is i(j). Note that the coil 202(j) is the j-th coil 202.

The upper part in FIG. 12 is a figure that takes the X-axis horizontally and the Y-axis vertically, and extracts and illustrates six coils 202 facing the permanent magnet 303bR. The middle part in FIG. 12 is a figure in which the figure in the upper part in FIG. 12 is viewed from the Y direction. The coils 202 are assigned numbers j from 1 to 6 in the order in which they are arranged in the X direction, and each coil 202 is identified by, for example, a coil 202(1).

As illustrated in figures in the upper part and the middle part of FIG. 12, the coils 202 are arranged at a pitch of a distance L. On the other hand, the permanent magnets 303 of the mover 301 are arranged at a pitch of 3/2*L distance.

The lower graph in FIG. 12 is a graph schematically shows the magnitude of the force Fx in the X direction and the force Fz in the Z direction generated when a unit current is applied to each coil 202 illustrated in the figures in the upper part and the middle part in FIG. 12.

For simplicity, in FIG. 12, the origin Oc of the position of the coil 202 in the X direction is set as the middle of the coil 202(3) and the coil 202(4), and the center Om of the permanent magnet 303bR in the X direction is set as the origin. Therefore, FIG. 12 illustrates a case where Oc and Om coincide, that is, a case where X=0.

At this time, for example, the force per unit current acting on the coil 202(4) has a magnitude of Fx(4, 0) in the X direction and a magnitude of Fz(4, 0) in the Z direction. The force per unit current applied to the coil 202(5) has a magnitude of Fx(5, 0) in the X direction and a magnitude of Fz(5, 0) in the Z direction.

Here, the current values applied to the coils 202(1) to 202(6) are defined as i(1) to i(6), respectively. Then, the magnitude FxfR of the force acting in the X direction and the magnitude FzfR of the force acting in the Z direction with respect to the permanent magnet 303bR are generally expressed by the following Equations (9) and (10), respectively.

$$FxfR = Fx(1,X)*i(1) + Fx(2,X)*i(2) + Fx(3,X)*i(3) + Fx(4,X)*i(4) + Fx(5,X)*i(5) + Fx(6,X)*i(6) \quad \text{Equation (9)}$$

$$FzfR = Fz(1,X)*i(1) + Fz(2,X)*i(2) + Fz(3,X)*i(3) + Fz(4,X)*i(4) + Fz(5,X)*i(5) + Fz(6,X)*i(6) \quad \text{Equation (10)}$$

By determining the current command value so that current values i(1) to i(6) satisfying Equations (9) and (10) are applied to the coils 202(1) to 202(6), respectively, it is possible to apply force to the permanent magnet 303bR independently in the X direction and the Z direction. The coil current calculation function 505 can determine a current command value to be applied to the coil 202(j) as described above in order to apply force to the permanent magnet 303 independently in the X direction and the Z direction.

For further simplicity, a case is considered in which, in the case of FIG. 12, only the coils 202(3), 202(4), and 202(5) out of the coils 202(1) to 202(6) are used with respect to the permanent magnet 303bR, and further, control is performed so that the sum of these three current values becomes zero. In this example, the force FxfR acting in the X direction and the force FzfR acting in the Z direction with respect to the permanent magnet 303bR are represented by the following Equations (11) and (12), respectively.

$$FxfR = Fx(3,X)*i(3) + Fx(4,X)*i(4) + Fx(5,X)*i(5) \quad \text{Equation (11)}$$

$$FzfR = Fz(3,X)*i(3) + Fz(4,X)*i(4) + Fz(5,X)*i(5) \quad \text{Equation (12)}$$

The current values of the coils 202(1) to 202(6) can be set so as to satisfy the following Equations (13) and (14).

$$i(3) + i(4) + i(5) = 0 \quad \text{Equation (13)}$$

$$i(1) = i(2) = i(6) = 0 \quad \text{Equation (14)}$$

Therefore, when the required force magnitude (FxfR, FzfR) with respect to the permanent magnet 303bR is determined, the current values i(1), i(2), i(3), i(4), i(5), and i(6) can be uniquely determined. According to the current command value thus determined, force is applied to the mover 301 in the X direction and the Z direction. By the force applied to the mover 301 in the X direction, the mover 301 obtains thrust force for moving in the X direction and moves in the X direction. The attitude of the mover 301 is controlled by the force in the X direction and the force in the Z direction applied to the mover 301 according to the current command value thus determined.

Thus, the integration controller 401 controls each of the six-axis components of the force applied to the mover 301 by controlling the current applied to the plurality of coils 202.

Note that, when the center Oc of the coil 202 is moved relative to the center Om of the permanent magnet 303bR by the transport of the mover 301, that is, when X+0, the coil 202 can be selected in accordance with the moved position. Further, the same calculation as described above can be performed based on the force per unit current generated in the coil 202.

As described above, by determining and controlling the current command value of the current applied to the plurality of coils 202, the integration controller 401 controls the contactless transport of the mover 301 over the stator 201 while controlling the attitude of the mover 301 over the stator 201 in six axes. That is, the integration controller 401 functions as a transport control means for controlling the transport of the mover 301, and controls the transport of the mover 301 over the stator 201 in a contactless manner by controlling the electromagnetic force applied to the permanent magnet 303 by the plurality of coils 202. Further, the integration controller 401 functions as an attitude control means for controlling the attitude of the mover 301, and controls the attitude of the mover 301 over the stator 201 in six axes. Note that all or part of the functions of the integration controller 401 as the control apparatus may be replaced by another controller such as the coil controller 402.

As described above, according to the present embodiment, the plurality of coils 202 arranged in two lines can apply force of six axes including three-axis force components (Tx, Ty, Tz) and three-axis moment components (Twx, Twy, Twz) to the mover 301. Thus, the transport of the mover 301 can be controlled while controlling the attitude of the mover 301 in six axes. According to the present embodiment, the transport of the mover 301 can be controlled while controlling the six axes of the attitude of the mover 301 by the coils 202 of two lines having the number of lines smaller than the number of the six-axis components of the force which is a variable to be controlled.

Therefore, according to the present embodiment, since it is possible to reduce the number of lines of the coils 202, the mover 301 can be transported in a contactless manner while controlling the attitude of the mover 301 without increasing the size or complexity of the system. Furthermore, according to the present embodiment, since it is possible to reduce the number of lines of the coils 202, a small-sized magnetically floating transport apparatus can be constructed at low cost.

In addition, according to the present embodiment, even in a configuration in which the Y sensor 102 and the Z sensor 103 are switched in accordance with the transport of the mover 301, the position and attitude of the mover 301 in the direction crossing the transport direction can be detected in a wide range and with high accuracy. Further, the detection range can be easily expanded without lowering the resolution by simply expanding the detection range of the linear scale.

Modified Embodiment

The present invention is not limited to the embodiments described above, and various modifications are possible.

For example, in the above embodiment, the transfer apparatus 1 is constructed by the moving magnet type linear motor in which the permanent magnets 303 are arranged on the mover 301 and the coils 202 are arranged on the stator 201, but the embodiment is not limited thereto. The transport apparatus 1 may be constructed by a moving coil type linear motor in which the permanent magnets 303 are arranged on the stator 201 and the coils 202 are arranged on the mover 301.

Further, the transport apparatus according to the present invention can be used as a transport apparatus that transports a workpiece together with a mover to an operation area of each process apparatus such as a machine tool or the like that performs each operation process on the workpiece that is to be an article in a manufacturing system that manufactures an article such as an electronic device or the like. The process apparatus that performs the operation process may be any apparatus such as an apparatus that performs assembly of a component to a workpiece, an apparatus that performs painting, or the like. Further, the article to be manufactured is not limited to a particular article and may be any component.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible when an incremental encoder is used to detect the position and/or attitude of the mover in a wide range and with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-201832, filed Dec. 13, 2021, which is hereby incorporated by reference herein in its entirety.

What is claimed is:

1. A transport apparatus comprising:
a stator;
a mover that includes a first scale and is movable along the stator in a first direction;
a plurality of first detectors provided facing said first scale, wherein a position of the mover in a second direction intersecting the first direction is detected by at least two first detectors of the plurality of first detectors, the at least two first detectors facing the first scale by movement of the mover; and
a control unit that controls position and/or attitude of the mover,
wherein the first scale and the plurality of first detectors constitute an incremental encoder,
wherein the plurality of first detectors are arranged at a predetermined interval along the first direction in the stator, and
wherein, when one first detector of the plurality of the first detectors starts detecting the first scale by movement of the mover, the control unit corrects a detection value of the one first detector with a detection value of another one of the first detectors that has already detected the first scale.

2. The transport apparatus according to claim 1,
wherein the plurality of the first detectors includes a second detector detecting the first scale and a third detector that starts to detect the first scale when the second detector is detecting the first scale, and
wherein the control unit corrects position information of the mover by a detection value of the third detector based on position information of the mover by a detection value of the second detector.

3. The transport apparatus according to claim 2,
wherein the plurality of the first detectors includes a fourth detector detecting the first scale,
wherein the fourth detector starts to detect the first scale when the third detector is detecting the first scale, and
wherein the control unit corrects the position information of the mover by the detection value of the fourth detector based on the position information of the mover by the detection value of the third detector and position information of the mover by a detection value of the second detector.

4. The transport apparatus according to claim 1,
wherein the mover includes a second scale,
wherein the transport apparatus includes a plurality of fifth detectors facing the second scale and that detect a position of the mover in a third direction crossing the first direction and the second direction; and
wherein the second scale and the plurality of fifth detectors constitute an incremental encoder,
wherein the plurality of fifth detectors are arranged at a predetermined interval along the first direction in the stator, and
wherein the control unit corrects position information of the mover by a detection value of one of the fifth detectors based on position information of the mover by a detection value of another of the fifth detectors.

5. The transport apparatus according to claim 1, wherein the control unit controls an attitude of the mover based on the position information of the mover based on the detection value of at least one of the plurality of first detectors.

6. The transport apparatus according to claim 1, wherein the predetermined interval at which the plurality of first detectors are arranged along the first direction is equal to or less than a length of the first scale along the first direction.

7. The transport apparatus according to claim 1,
wherein the mover includes a plurality of permanent magnets,
wherein the stator includes a plurality of coils, and
wherein the control unit controls force acting between the plurality of permanent magnets and the plurality of coils.

8. The transport apparatus according to claim 1,
wherein the mover includes a plurality of coils,
wherein the stator includes a plurality of permanent magnets, and
wherein the control unit controls force acting between the plurality of permanent magnets and the plurality of coils.

9. A production system comprising:
the transport apparatus according to claim 1; and
a production apparatus that performs operation on a workpiece transported by the mover.

10. An article manufacturing method of manufacturing an article by using the production system according to claim 9, the article manufacturing method comprising:
transporting the workpiece by using the mover; and
performing, by using the production apparatus, the operation on the workpiece transported by the mover.

11. A control method of a transport apparatus comprising: a stator, a mover that includes a first scale and is movable along the stator in a first direction, and a plurality of first detectors facing said first scale, wherein a position of the mover in a second direction intersecting the first direction is detected by at least two first detectors of the plurality of first detectors, the at least two first detectors facing the first scale by movement of the mover, wherein the first scale and the plurality of first detectors constitute an incremental encoder, and wherein the plurality of first detectors are arranged at a predetermined interval along the first direction in the stator, the control method comprising:
when one first detector of the plurality of the first detectors starts detecting the first scale by movement of the mover, correcting a detection value of the one first detector with a detection value of another first detector that has already detected the first scale.

* * * * *